(12) United States Patent
Berlowitz et al.

(10) Patent No.: US 9,819,042 B2
(45) Date of Patent: Nov. 14, 2017

(54) FUEL CELL INTEGRATION WITHIN A HEAT RECOVERY STEAM GENERATOR

(71) Applicants: Paul J. Berlowitz, Glen Gardner, NJ (US); Timothy Andrew Barckholtz, Whitehouse Station, NJ (US); Frank Hershkowitz, Basking Ridge, NJ (US)

(72) Inventors: Paul J. Berlowitz, Glen Gardner, NJ (US); Timothy Andrew Barckholtz, Whitehouse Station, NJ (US); Frank Hershkowitz, Basking Ridge, NJ (US)

(73) Assignee: EXXONMOBIL RESEARCH AND ENGINEERING COMPANY, Annandale, NJ (US)

( * ) Notice: Subject to any disclaimer, the term of this patent is extended or adjusted under 35 U.S.C. 154(b) by 706 days.

(21) Appl. No.: 14/325,664

(22) Filed: Jul. 8, 2014

(65) Prior Publication Data
US 2015/0093676 A1   Apr. 2, 2015

Related U.S. Application Data

(63) Continuation-in-part of application No. 14/207,696, filed on Mar. 13, 2014, now abandoned, which is a
(Continued)

(51) Int. Cl.
*H01M 8/14* (2006.01)
*H01M 8/04* (2016.01)
(Continued)

(52) U.S. Cl.
CPC .............. *H01M 8/145* (2013.01); *C01B 3/50* (2013.01); *C10G 2/32* (2013.01); *C10K 3/04* (2013.01);
(Continued)

(58) Field of Classification Search
CPC .. H01M 8/145; H01M 8/04007; H01M 8/249; H01M 8/0668; H01M 8/2475;
(Continued)

(56) References Cited

U.S. PATENT DOCUMENTS 3,615,839 A   10/1971   Thompson et al.
3,970,474 A   7/1976   Anbar et al.
(Continued)

FOREIGN PATENT DOCUMENTS

CN   101098022 A   1/2008
CN   201902241 U   7/2011
(Continued)

OTHER PUBLICATIONS

International Search Report with Written Opinion from PCT/US2014/058005 dated Dec. 2, 2014.
(Continued)

*Primary Examiner* — Ula C Ruddock
*Assistant Examiner* — Matthew Van Oudenaren
(74) *Attorney, Agent, or Firm* — Liza Negron; Chad A. Guice

(57) ABSTRACT

Systems and methods are provided for incorporating molten carbonate fuel cells into a heat recovery steam generation system (HRSG) for production of electrical power while also reducing or minimizing the amount of $CO_2$ present in the flue gas exiting the HRSG. An optionally multi-layer screen or wall of molten carbonate fuel cells can be inserted into the HRSG so that the screen of molten carbonate fuel cells substantially fills the cross-sectional area. By using the walls of the HRSG and the screen of molten carbonate fuel cells to form a cathode input manifold, the overall amount of duct or flow passages associated with the MCFCs can be reduced.

12 Claims, 7 Drawing Sheets

Related U.S. Application Data continuation-in-part of application No. 14/207,698, filed on Mar. 13, 2014, now Pat. No. 9,419,295, and a continuation-in-part of application No. 14/207,704, filed on Mar. 13, 2014, now abandoned, and a continuation-in-part of application No. 14/207,706, filed on Mar. 13, 2014, now Pat. No. 9,455,463, and a continuation-in-part of application No. 14/207,691, filed on Mar. 13, 2014, now Pat. No. 9,257,711, and a continuation-in-part of application No. 14/207,693, filed on Mar. 13, 2014, and a continuation-in-part of application No. 14/207,697, filed on Mar. 13, 2014, and a continuation-in-part of application No. 14/207,699, filed on Mar. 13, 2014, and a continuation-in-part of application No. 14/207,700, filed on Mar. 13, 2014, now abandoned, and a continuation-in-part of application No. 14/207,705, filed on Mar. 13, 2014, now abandoned, and a continuation-in-part of application No. 14/207,708, filed on Mar. 13, 2014, now Pat. No. 9,647,284, and a continuation-in-part of application No. 14/207,711, filed on Mar. 13, 2014, now Pat. No. 9,735,440, and a continuation-in-part of application No. 14/207,714, filed on Mar. 13, 2014, now Pat. No. 9,343,764, and a continuation-in-part of application No. 14/207,710, filed on Mar. 13, 2014, now Pat. No. 9,362,580, and a continuation-in-part of application No. 14/207,712, filed on Mar. 13, 2014, now Pat. No. 9,343,763, and a continuation-in-part of application No. 14/207,721, filed on Mar. 13, 2014, now Pat. No. 9,520,607, and a continuation-in-part of application No. 14/207,726, filed on Mar. 13, 2014, now Pat. No. 9,263,755, and a continuation-in-part of application No. 14/207,728, filed on Mar. 13, 2014.

(60) Provisional application No. 61/884,376, filed on Sep. 30, 2013, provisional application No. 61/884,545, filed on Sep. 30, 2013, provisional application No. 61/884,565, filed on Sep. 30, 2013, provisional application No. 61/884,586, filed on Sep. 30, 2013, provisional application No. 61/884,605, filed on Sep. 30, 2013, provisional application No. 61/884,635, filed on Sep. 30, 2013, provisional application No. 61/889,757, filed on Oct. 11, 2013.

(51) Int. Cl.
| | |
|---|---|
| *H01M 8/24* | (2016.01) |
| *H01M 8/04007* | (2016.01) |
| *H01M 8/249* | (2016.01) |
| *C01B 3/50* | (2006.01) |
| *C10K 3/04* | (2006.01) |
| *C10G 2/00* | (2006.01) |
| *H01M 8/0668* | (2016.01) |
| *H01M 8/2475* | (2016.01) |
| *F01K 5/02* | (2006.01) |

(52) U.S. Cl.
CPC ........... *F01K 5/02* (2013.01); *H01M 8/04007* (2013.01); *H01M 8/04067* (2013.01); *H01M 8/0668* (2013.01); *H01M 8/249* (2013.01); *H01M 8/2475* (2013.01); *C01B 2203/0233* (2013.01); *C01B 2203/0283* (2013.01); *C01B 2203/043* (2013.01); *C01B 2203/0405* (2013.01); *C01B 2203/046* (2013.01); *C01B 2203/0415* (2013.01); *C01B 2203/0475* (2013.01); *C01B 2203/0495* (2013.01); *C01B 2203/061* (2013.01); *C01B 2203/062* (2013.01); *C01B 2203/066* (2013.01); *C01B 2203/067* (2013.01); *C01B 2203/148* (2013.01); *C01B 2203/84* (2013.01); *C01B 2203/86* (2013.01); *C10G 2300/4043* (2013.01); *H01M 2008/147* (2013.01); *H01M 2250/405* (2013.01); *Y02B 90/16* (2013.01); *Y02E 20/16* (2013.01); *Y02E 60/526* (2013.01); *Y02E 60/566* (2013.01); *Y02P 20/13* (2015.11); *Y02P 30/30* (2015.11); *Y02P 30/446* (2015.11)

(58) Field of Classification Search
CPC ....... H01M 8/04067; H01M 2008/147; H01M 2250/405; F01K 5/02; C10G 2/32; C10G 2300/4043; C10K 3/04; C01B 3/50; C01B 2203/0233; C01B 2203/0283; C01B 2203/0405; C01B 2203/0415; C01B 2203/043; C01B 2203/046; C01B 2203/0475; C01B 2203/0495; C01B 2203/061; C01B 2203/062; C01B 2203/066; C01B 2203/067; C01B 2203/148; C01B 2203/84; C01B 2203/86
See application file for complete search history.

(56) References Cited

U.S. PATENT DOCUMENTS

| | | |
|---|---|---|
| 4,041,210 A | 8/1977 | Van Dine |
| 4,810,595 A | 3/1989 | Kahara et al. |
| 4,921,765 A | 5/1990 | Geisbrecht et al. |
| 5,039,579 A | 8/1991 | Kinoshita |
| 5,079,103 A | 1/1992 | Schramm |
| 5,082,752 A | 1/1992 | Koga et al. |
| 5,084,362 A | 1/1992 | Farooque |
| 5,134,043 A | 7/1992 | Nakazawa |
| 5,169,717 A | 12/1992 | Topsoe |
| 5,198,311 A | 3/1993 | Nakazawa et al. |
| 5,208,113 A | 5/1993 | Kinoshita |
| 5,232,793 A | 8/1993 | Miyauchi et al. |
| 5,380,600 A | 1/1995 | Hansen et al. |
| 5,413,878 A | 5/1995 | Williams et al. |
| 5,422,195 A | 6/1995 | Bernard |
| 5,470,670 A | 11/1995 | Yasumoto et al. |
| 5,541,014 A | 7/1996 | Micheli et al. |
| 5,554,453 A | 9/1996 | Steinfeld et al. |
| 5,616,430 A | 4/1997 | Aoyama |
| 5,736,026 A | 4/1998 | Patel et al. |
| 6,083,636 A | 7/2000 | Hsu |
| 6,090,312 A | 7/2000 | Ziaka et al. |
| 6,126,718 A | 10/2000 | Sawa et al. |
| 6,267,799 B1 | 7/2001 | Innes et al. |
| 6,322,916 B1 | 11/2001 | Hemmes et al. |
| 6,365,290 B1 | 4/2002 | Ghezel-Ayagh et al. |
| 6,383,251 B1 | 5/2002 | Sherwood |
| 6,524,356 B2 | 2/2003 | Fournier et al. |
| 6,648,942 B2 | 11/2003 | Hoffman et al. |
| 6,896,988 B2 | 5/2005 | Wang et al. |
| 7,311,986 B2 | 12/2007 | Hsu |
| 7,396,603 B2 * | 7/2008 | Farooque ............ H01M 8/0612 429/410 |
| 7,862,938 B2 * | 1/2011 | Ghezel-Ayagh ........ F02C 1/007 429/425 |
| 7,914,765 B2 | 3/2011 | McLean et al. |
| 8,080,344 B2 | 12/2011 | Skok et al. |
| 8,349,504 B1 | 1/2013 | Radovich |
| 8,562,903 B2 | 10/2013 | Hayton et al. |
| 2002/0142208 A1 | 10/2002 | Keefer et al. |
| 2003/0008183 A1 | 1/2003 | Hsu |
| 2004/0038089 A1 | 2/2004 | Hoffman et al. |
| 2004/0091764 A1* | 5/2004 | Hsu ........................ F02C 3/36 429/478 |
| 2005/0079395 A1 | 4/2005 | Varatharajan et al. |
| 2005/0112425 A1 | 5/2005 | Hsu |
| 2005/0123810 A1 | 6/2005 | Balan |

(56) References Cited

U.S. PATENT DOCUMENTS

| | | |
|---|---|---|
| 2005/0181247 A1 | 8/2005 | Foger et al. |
| 2005/0271914 A1 | 12/2005 | Farooque et al. |
| 2006/0127718 A1 | 6/2006 | Kurashima et al. |
| 2006/0159967 A1 | 7/2006 | Huijsmans et al. |
| 2007/0224467 A1 | 9/2007 | Nervi et al. |
| 2007/0287046 A1 | 12/2007 | Koda et al. |
| 2008/0057361 A1 | 3/2008 | Moon et al. |
| 2008/0160358 A1 | 7/2008 | Parodi et al. |
| 2009/0042070 A1 | 2/2009 | Brown, Jr. et al. |
| 2009/0317667 A2 | 12/2009 | Nervi et al. |
| 2009/0317669 A1 | 12/2009 | Hildebrandt et al. |
| 2010/0015486 A1 | 1/2010 | Yoshiba |
| 2010/0148410 A1 | 6/2010 | Bleifuss et al. |
| 2011/0104577 A1 | 5/2011 | Cui et al. |
| 2011/0111315 A1 | 5/2011 | Cui et al. |
| 2011/0117460 A1 | 5/2011 | Shin |
| 2011/0154951 A1 | 6/2011 | Hiraoka |
| 2011/0171544 A1 | 7/2011 | Burmeister et al. |
| 2011/0223500 A1 | 9/2011 | Uematsu et al. |
| 2011/0223501 A1 | 9/2011 | Uematsu et al. |
| 2012/0028145 A1 | 2/2012 | Boden et al. |
| 2012/0171588 A1 | 7/2012 | Fan et al. |
| 2012/0214076 A1 | 8/2012 | Hakala |
| 2012/0251898 A1 | 10/2012 | Lehar et al. |
| 2012/0325053 A1 | 12/2012 | Grossi |
| 2013/0014484 A1 | 1/2013 | Caprile et al. |
| 2013/0081516 A1 | 4/2013 | Simmons |
| 2013/0177824 A1 | 7/2013 | Cui et al. |
| 2013/0209904 A1 | 8/2013 | Liu et al. |

FOREIGN PATENT DOCUMENTS

| | | |
|---|---|---|
| CN | 2694153 A1 | 9/2011 |
| EP | 1926171 A1 | 5/2008 |
| JP | 56069775 A | 6/1981 |
| JP | 08096824 A | 4/1996 |
| JP | 10172595 A | 6/1999 |
| JP | 11191427 A | 7/1999 |
| JP | 11312527 A | 11/1999 |
| JP | 2002319248 A | 10/2002 |
| JP | 2004014124 A | 1/2004 |
| JP | 2004079495 A | 3/2004 |
| JP | 2004186074 A | 7/2004 |
| JP | 2006073316 A | 3/2006 |
| JP | 2007287580 A | 11/2007 |
| JP | 2008192425 A | 8/2008 |
| JP | 2008287940 A | 11/2008 |
| JP | 2009043487 A | 2/2009 |
| JP | 2013045535 A1 | 3/2013 |
| KR | 100651270 B1 | 11/2006 |
| KR | 100827954 B1 | 5/2008 |
| KR | 20090067426 A | 6/2009 |
| KR | 20090124824 A | 12/2009 |
| KR | 20110029963 A | 3/2011 |
| KR | 20110032443 A | 3/2011 |
| KR | 101032974 B1 | 5/2011 |
| KR | 20110077775 A | 7/2011 |
| KR | 20120050319 A | 5/2012 |
| WO | 02103833 A1 | 12/2002 |
| WO | 03063276 A2 | 7/2003 |
| WO | 2004013924 A2 | 2/2004 |
| WO | 2010044113 A1 | 4/2010 |
| WO | 2010125443 A1 | 11/2010 |
| WO | 2010147886 A1 | 12/2010 |
| WO | 2012091096 A1 | 7/2012 |
| WO | 2012176176 A1 | 12/2012 |
| WO | 2012176177 A1 | 12/2012 |

OTHER PUBLICATIONS

Avidan, "Gasoline and Distillate Fuels from Methanol", Studies in Surface Science and Catalysis, 1988, vol. 36, pp. 307-323, Methane Conversion, Elsevier Science Publishers B.V., Amsterdam.

Keil, "Methanol-to-hydrocarbons: process technology" Microporous and Mesoporous Materials, Jun. 1999, vol. 29 (1-2), pp. 49-66, Elsevier.

Campanari, "Carbon Dioxide separation from high temperature fuel cell power plants", Journal of Power Sources, 2002, vol. 112, pp. 273-289, Science Direct, Elsevier.

Amorelli et al., "An experimental investigation into the use of molten carbonate fuel cells to capture CO2 from gas turbine exhaust gases", Energy, 2004, vol. 29, pp. 1279-1284, Science Direct, Elsevier.

Naqvi, "Dimethyl Ether As Fuel", SRI Consulting Report, Report No. 245A, Sep. 2005, Process Economics Program, Menlo Park, CA.

Greenhouse Gas Technology Center, "Test and Quality Assurance Plan: FuelCell Energy, Inc.—DFC 300A Molten Carbonate Fuel Cell Combined Heat and Power System" SRI/USEPA, Mar. 2007, pp. 1-42, Southern Research Institute, Morrisville, NC.

Abu-Zahra et al.,"CO2 capture from power plants Part I: A parametric study of the technical performance based on monoethanolamine", International Journal of Greenhouse Gas Control, 2007, vol. 1, pp. 37-46, ScienceDirect, Elsevier.

"Molten Carbonate Fuel Cell Technology", Fossil Energy Office of Communications, Jan. 11, 2011, U.S. Department of Energy.

Campanari et al., "Application of MCFCs for active CO2 capture within natural gas combine cycles" Energy Procedia, 2011, vol. 4, pp. 1235-1242, Science Direct, Elsevier.

Caprile, "Carbon capture: Energy wasting technologies or the MCFCs challenge?", International Journal of Hydrogen Energy, 2011, vol. 36, pp. 10269-10277, Science Direct, Elsevier.

Chiesa et al., "CO2 cryogenic separation from combined cycles integrated with molten carbonate fuel cells", International Journal of Hydrogen Energy, 2011, vol. 36, pp. 10355-10365, Science Direct, Elsevier.

Wesoff, "Will FuelCell Energy Be the First Profitable Company in the Industry?", Greentech Media, Dec. 15, 2011.

Manzolini et al., "CO2 Separation from Combined Cycles Using Molten Carbonate Fuel Cells," Journal of Fuel Cell Science and Technology, Feb. 2012, pp. 011018-1 to 011018-8, vol. 9, iss. 1, American Society of Mechanical Engineers.

Zhou et al., "Decrease of energy demand for bioethanol-based polygeneration system through case study," Applied Energy, Mar. 6, 2012, vol. 95, pp. 305-311, Elsevier.

Ghezel-Ayagh, "Electrochemical Membrane for CO2 Capture and Power Generation (No. DE-FE0007634)", presentation given at the 2012 NETL CO2 Capture Technology Meeting, Jul. 9, 2012, Pittsburgh, PA.

Desideri, U., et al., "MCFC-based CO2 capture system for small scale CHP plants," International Journal of Hydrogen Energy, Dec. 2012, pp. 19295-19303, vol. 37, iss. 24, SciVerse Science Direct, Elsevier.

Ghezel-Ayagh, "High Efficiency Direct FuelCell/Turbine® Power Plant", Project Fact Sheet for unit installed at the Billings Clinic in Billings, Montana, U.S. Department of Energy.

* cited by examiner

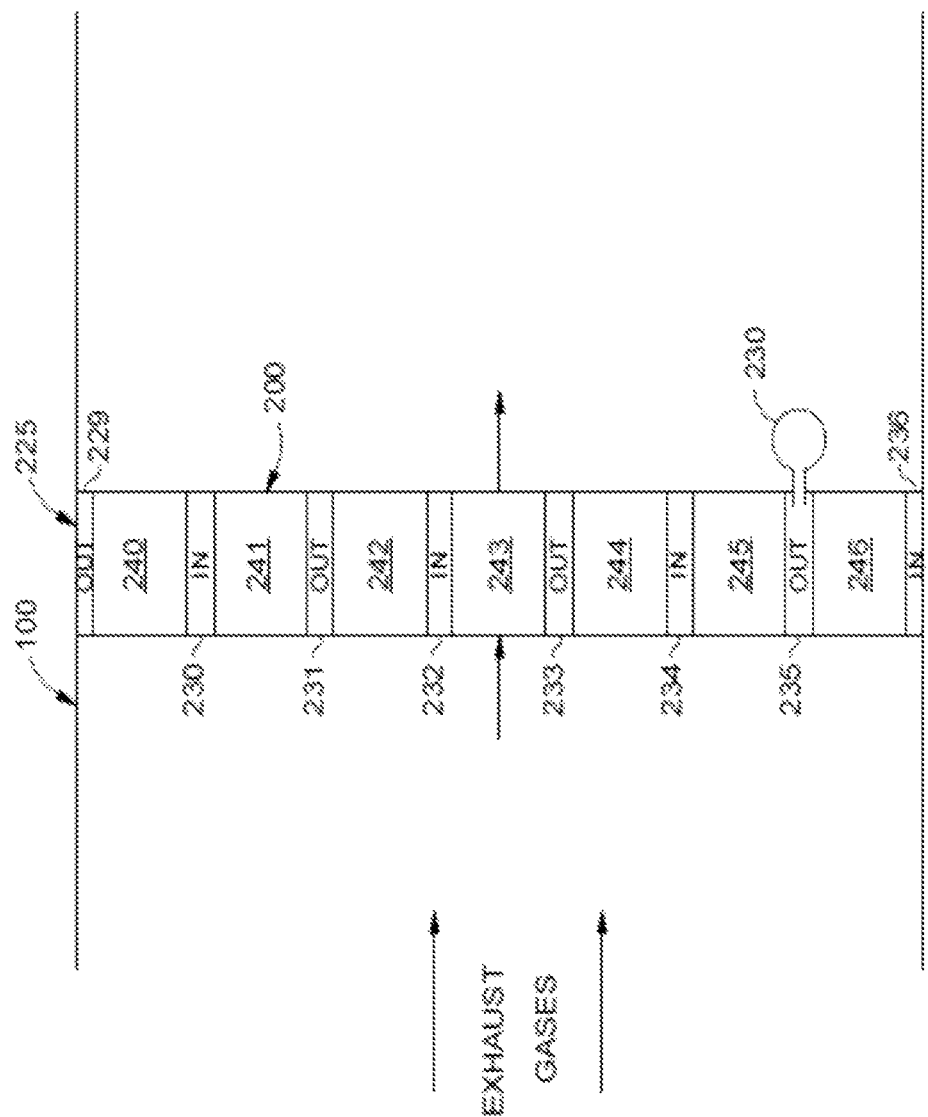

FUEL CELL INTEGRATION WITHIN A HEAT RECOVERY STEAM GENERATOR

CROSS-REFERENCE TO RELATED APPLICATIONS

This application claims the benefit of provisional U.S. application nos. 61/884,376, 61/884,545, 61/884,565, 61/884,586, 61/884,605, and 61/884,635, all filed on Sep. 30, 2013, and application No. 61/889,757, filed on Oct. 11, 2013, each of which is hereby incorporated in its entirety by reference herein. This application further claims priority to non-provisional U.S. application Ser. Nos. 14/207,691, 14/207,693, 14/207,696, 14/207,697, 14/207,698, 14/207,699, 14/697,700, 14/207,704, 14/207,705, 14/207,706, 14/207,708, 14/207,710, 14/207,711, 14/207,712, 14/207,714, 14/207,721, 14/207,726, and 14/207,728, all filed on Mar. 13, 2014, each of which is hereby incorporated in its entirety by reference herein.

Additionally, this application is related to provisional U.S. application nos. 61/787,587, 61/787,697, 61/787,879, and 61/788,628, all filed on Mar. 15, 2013, as well as non-provisional U.S. application Ser. Nos. 14/197,391, 14/197,430, 14/197,551, and 14/197,613, all filed on Mar. 5, 2014, and U.S. application Ser. Nos. 14/207,686, 14/207,687, 14/207,688, and 14/207,690, all filed on Mar. 13, 2014.

FIELD OF THE INVENTION

In various aspects, the invention is related to generating electricity and removing $CO_2$ from a turbine exhaust flow using molten carbonate fuel cells.

BACKGROUND OF THE INVENTION

Molten carbonate fuel cells utilize hydrogen and/or other fuels to generate electricity. The hydrogen may be provided by reforming methane or other reformable fuels in a steam reformer that is upstream of the fuel cell or within the fuel cell. Reformable fuels can encompass hydrocarbonaceous materials that can be reacted with steam and/or oxygen at elevated temperature and/or pressure to produce a gaseous product that comprises hydrogen. Alternatively or additionally, fuel can be reformed in the anode cell in a molten carbonate fuel cell, which can be operated to create conditions that are suitable for reforming fuels in the anode. Alternately or additionally, the reforming can occur both externally and internally to the fuel cell.

An article in the Journal of Fuel Cell Science and Technology (G. Manzolini et. al., *J. Fuel Cell Sci. and Tech.*, Vol. 9, Feb. 2012) describes a power generation system that combines a combustion power generator with molten carbonate fuel cells. Various arrangements of fuel cells and operating parameters are described. The combustion output from the combustion generator is used in part as the input for the cathode of the fuel cell. One goal of the simulations in the Manzolini article is to use the MCFC to separate $CO_2$ from the power generator's exhaust. The simulation described in the Manzolini article establishes a maximum outlet temperature of 660° C. and notes that the inlet temperature must be sufficiently cooler to account for the temperature increase across the fuel cell. The electrical efficiency (i.e. electricity generated/fuel input) for the MCFC fuel cell in a base model case is 50%. The electrical efficiency in a test model case, which is optimized for $CO_2$ sequestration, is also 50%.

An article by Desideri et al. (*Intl. J. of Hydrogen Energy*, Vol. 37, 2012) describes a method for modeling the performance of a power generation system using a fuel cell for $CO_2$ separation. Recirculation of anode exhaust to the anode inlet and the cathode exhaust to the cathode inlet are used to improve the performance of the fuel cell. The model parameters describe an MCFC electrical efficiency of 50.3%.

In a natural gas combined cycle power plant, exhaust gas from the gas turbine can be passed to a heat recovery steam generator (HRSG). A HRSG can include an inlet for receiving the exhaust gas from the turbine and an outlet that exhausts the exhaust gas received from the turbine after heat energy has been extracted from the exhaust gas. Between the inlet and outlet is a flow path, in which multiple heat exchangers are located. The heat exchangers extract heat from the exhaust gas as the gas travels from the inlet to the outlet. Different types of HRSGs can include different types and number of heat exchangers that generate steam for use in a steam turbine or elsewhere for process heat. For example, a three stage HRSG can include three different heat exchangers each generating either high, intermediate, or low pressure steam.

SUMMARY OF THE INVENTION

In an aspect, a heat recovery steam generator ("HRSG") for producing electricity using an integrated molten carbonate fuel cell comprising an anode and cathode is provided, the HRSG comprising: an enclosure that forms a flow path that extends between an inlet that receives a gas flow and an outlet that exhausts at least a portion of the received gas flow; one or more heat exchangers extending into the flow path; and a fuel cell screen located within the enclosure and comprising a plurality of molten carbonate fuel cells having cathode inlets, the fuel cell screen being oriented in the flow path so that the cathode inlets of the molten carbonate fuel cells receive substantially all of the received gas flow, the plurality of molten carbonate fuel cells also having a plurality of cathode outlets fluidly exposed to the flow path to discharge cathode exhaust to the flow path.

In another aspect, a method of treating exhaust gas to reduce $CO_2$ using molten carbonate fuel cells located inside a heat recovery steam generator ("HRSG") is provided, the method comprising: receiving $CO_2$-containing exhaust gas, such as exhaust from a gas turbine, through an inlet of the HRSG to form a received gas flow; passing the received gas flow through a fuel cell screen comprising a plurality of molten carbonate fuel cells to generate a cathode exhaust gas comprising at least about 50 vol % less $CO_2$ than the received gas flow, the fuel cell screen being located within the HRSG, wherein substantially all of the received gas flow is passed into a cathode section of the molten carbonate fuel cells; passing the cathode exhaust gas into a first heat exchanger; and passing the cathode exhaust gas into an exhaust stack.

BRIEF DESCRIPTION OF THE FIGURES

FIG. 7 schematically shows a top view of a screen comprising molten carbonate fuel cell stacks integrated into a heat recovery steam generator.

DETAILED DESCRIPTION OF THE EMBODIMENTS

Overview

Figure 1:
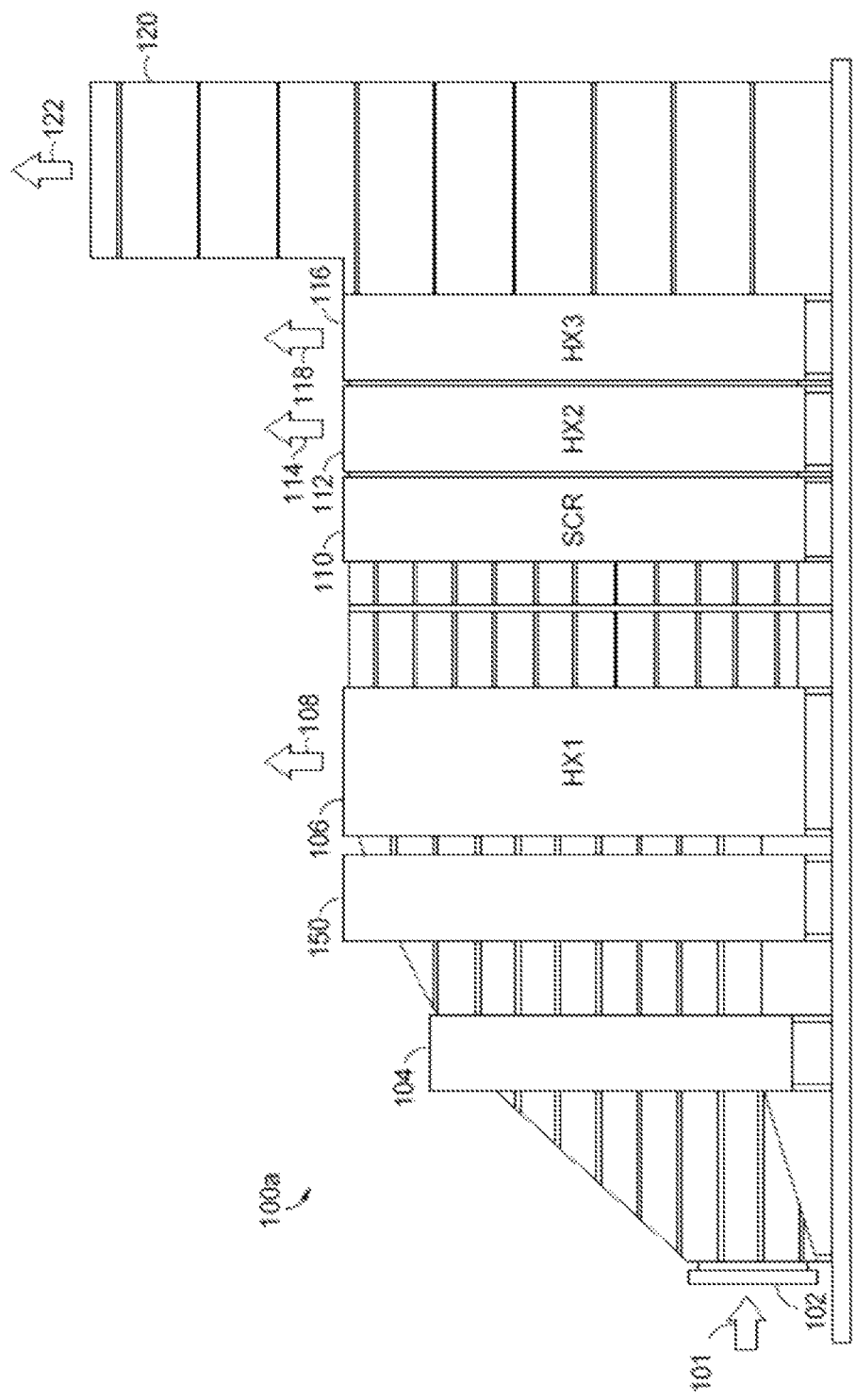
FIG. 1 schematically shows a molten carbonate fuel cell integrated into a heat recovery steam generator between a duct burner and a heat exchanger.

In various aspects, systems and methods are provided for incorporating molten carbonate fuel cells into a heat recovery steam generation system (HRSG) for production of electrical power while also reducing or minimizing the amount of $CO_2$ present in the flue gas exiting the HRSG. Integration of molten carbonate fuel cells into a HRSG system can provide various advantages. One potential advantage can be related to the volume of the enclosure that can typically be used for a HRSG system. Because the HRSG system has a limited cross-sectional area, a (multi-layer) screen or wall of molten carbonate fuel cells can be inserted into the HRSG so that the screen of molten carbonate fuel cells substantially fills the cross-sectional area. This can allow the combination of the fuel cell screen and the walls of the HRSG to act as the manifold for the cathode inlets of the fuel cells, as the gas passing through the HRSG is forced to pass through one of the fuel cell cathodes in order to continue flowing downstream in the HRSG. By using the walls of the HRSG and the screen of molten carbonate fuel cells to form the cathode input manifold, the overall amount of duct or flow passages associated with the MCFCs can be reduced. In some aspects, the benefits of this type of configuration can include reducing the amount of insulation typically associated with MCFC installations. Additionally or alternatively, the benefits of this type of configuration can include other efficiency improvements, such as directly reducing heat losses in comparison with a separate MCFC system.

Another potential advantage is that the molten carbonate fuel cells can be added to a process train for handling the exhaust from a turbine (or other source of a hot $CO_2$-containing stream) while reducing or minimizing the amount of additional equipment footprint required.

Still another advantage can be that incorporating the molten carbonate fuel cells into the HRSG system can allow the input stream to the HRSG to be passed into the cathode(s) of the molten carbonate fuel cells at a location in the HRSG where the temperature of the input stream is suitable for use in a fuel cell. Yet another advantage is that the heat produced or consumed by the MCFC is integrated into the HRSG without requiring additional or external heat exchange, as might be required for a standalone system.

Still another advantage can be that incorporating the molten carbonate fuel cells reduces or minimizes the need to perform selective catalytic reduction (SCR) on a gas flow passing through an HRSG system. In some aspects, a molten carbonate fuel cell can reduce the content of $NO_x$ compounds present in a gas flow passed into the cathode inlet of the fuel cell. Still yet other advantages can also potentially be realized depending on the configuration. Additional details related to operation of molten carbonate fuel cells for reduction of $NO_x$ can be found, for example, in U.S. application Ser. No. 14/207,699, the relevant contents of which are incorporated herein by reference.

Because fuel cells can operate, from an input gas flow vantage point, effectively in parallel, conventional molten carbonate fuel cell designs can involve incorporating multiple stacks of fuel cells into an enclosure, and then using a manifold to distribute the gas stream for the cathode inlets of the fuel cells to the various enclosures. A parallel flow configuration can have the advantage that the MCFC stacks or modules used to form the screen of MCFC's (such as a multi-layer screen) can see nominally similar input gas conditions (pressure, temperature, compositions, flow rates), and/or can produce similar outputs and performance parameters. The parallel flow configuration may not impact how the fuel cell electrical output is combined as the cell (or stack or array) electrical outputs can be arranged in a parallel, a series, or a combination of parallel and series configurations.

One of the challenges in using molten carbonate fuel cells (MCFCs) for processing of large scale $CO_2$-containing streams, such as exhaust streams from turbines, is providing a sufficient number of MCFCs to effectively process the volume of the exhaust stream. The size of large scale commercial gas turbines (typically 100-400 MW) are much larger than the size of typical MCFC stacks (or stack arrays) currently available (300 kW to 1.4 MW). The pairing of an MCFC system for processing the $CO_2$ containing outlet of a gas turbine could require a very large number of stacks or arrays requiring a large number of valves, interconnects, ducts and manifolds. For example, in order to process a commercial turbine's exhaust, a complicated manifold may be needed to distribute the exhaust to a large plurality of fuel cell enclosures. A separate MCFC system would require a substantial additional footprint within a power production plant.

One way of conserving equipment footprint can be to incorporate molten carbonate fuel cells into a heat recovery steam generation (HRSG) system. Incorporating the MCFC's into an HRSG system can allow the walls of the HRSG system to serve as the manifold for directing the gas flow in the HRSG through a (multi-layer) screen of MCFC's. HRSG systems can conventionally be used in a variety of settings. HRSG systems allow for production of additional electrical power by using the heat in a gas flow, such as an exhaust gas flow or another combustion exhaust gas flow, to generate steam. This steam can then be used to operate a steam turbine for generation of electrical power.

Processing the exhaust from a gas turbine is an example of a typical application for an HRSG system. Conventional HRSG systems can have a typical superficial gas velocity of about 6 m/s (20 ft/s) in the (high temperature) region of an HRSG in which a MCFC could be deployed. Conventional gas turbines can generate about 6 $m^3$/s of ~600° C. exhaust gas for every MW of turbine power. Based on these typical values, a typical flow cross-section for an HRSG can correspond to about 1 $m^2$ of HRSG cross-section for every MW of gas turbine capacity. In other words, there is about 1 MW of gas turbine power per $m^2$ of HRSG cross section. Such a typical area/power level is a result of optimizing many parameters in HRSG design, such as pressure drop and construction cost, and may vary substantially in a given application, such as about 0.5 MW/$m^2$ to about 2.0 MW/$m^2$.

Molten Carbonate fuel cells are also dimensioned in a way that optimizes manufacturing and operating parameters, resulting in a certain power level for a fuel cell stack and a cross-sectional area of the cathode face of the stack that corresponds to this power level. Using performance parameters typical of gas turbines and MCFC stacks, arranging a single layer of conventional MCFC stacks in a space-filling manner within an HRSG typically does not result in a sufficient number of MCFC stacks within a conventional HRSG design to achieve high (>80%) levels of $CO_2$ recovery from the flue gas. Typical commercial MCFC's as operated with high fuel utilizations have power levels of about 0.05 to 0.10 MW/m$^2$ of cathode face area. For deployment of MCFC's as a single layer screen of fuel cells within a HRSG, the cross-sectional area of the HRSG is roughly the same as the cross-sectional area of the cathode face of the fuel cell. Thus, considering the 'typical' HRSG, a single layer screen of MCFC's could produce 5 to 10 MW of fuel cell power for every 100 MW of gas turbine power. More generally, considering the range of HRSG design, a single layer MCFC screen could produce 2.5-20 MW of power for every 100 MW of gas turbine power. However, for a MCFC system designed to utilize 80% of the $CO_2$ in a methane-fired gas turbine's exhaust, about 25 MW of fuel cells are needed per 100 MW of gas turbine, as compared to the 2.5-20 MW of fuel cells that can be arranged as a single screen within an HRSG design. In other words, a single layer screen of MCFC's arranged in an HRSG can utilize 8% to 64% of the $CO_2$ in the gas turbine's exhaust. This can limit the amount of carbon capture that is feasible using conventional designs of MCFC's and/or HRSG systems.

In various aspects, the gas turbine exhaust $CO_2$ can be utilized at a greater level by modifying the design and/or operation of the MCFC and/or the HRSG. This can allow a cathode exhaust to be generated that has a $CO_2$ concentration that is reduced relative to the received gas flow by at least about 65%, or by at least about 70%, or by at least about 75%, or by at least about 80%. In some aspects, the available cathode inlet surface area for the fuel cells can be increased by allowing the fuel cell screen to correspond to a multi-layer screen. In this type of aspect, the initial layers of the MCFC screen can have gaps that allow a portion of the gas flow to bypass one or more upstream layers while still constraining substantially all of the gas flow within the HRSG to pass through one of the MCFC cathodes. In various aspects, constraining substantially all of the gas flow within the HRSG to pass through one of the MCFC cathodes can correspond to having at least about 98.0 vol % of the gas entering a cathode inlet, or at least about 99.0 vol %, or at least about 99.5 vol %. This allows a larger cross-section of fuel cells to be presented within a smaller cross-sectional area while still having the gas flow in the HRSG pass through only one (or only one series) of MCFC cathode(s).

Figure 8:
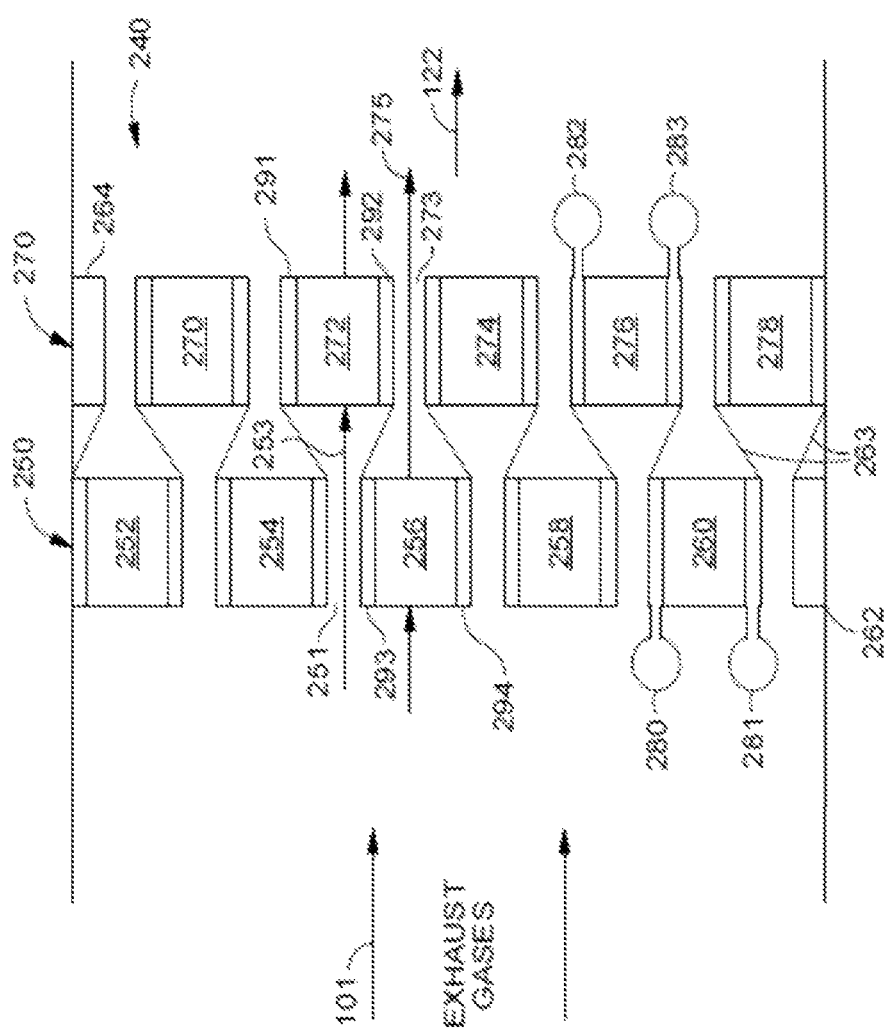
FIG. 8 schematically shows a top view of a multi-row screen comprising molten carbonate fuel cell stacks integrated into a heat recovery steam generator.

In this discussion, a "fuel cell screen" is defined as an array of fuel cell stacks or modules within the HRSG wherein the flow path for exhaust gas (or other gas flow) traveling through the HRSG results in the gas flow passing through only a single fuel cell stack or module. In other words, gas that exits from the cathode outlets of the fuel cell stacks or modules in a fuel cell screen is substantially (or entirely) prevented from re-entering a cathode inlet of the same fuel cell screen. Substantially preventing re-entry of gas that exits from the cathode can correspond to having less than about 1.0 vol % of the gas re-entering a cathode inlet of the same fuel cell screen, or less than about 0.5 vol %, or less than about 0.1 vol %, or less than about 0.01 vol %. The fuel cell screen may incorporate flow paths that allow for a plurality of layers, such as shown in FIG. 8, but wherein the layers are all located proximate to each other and do not have intervening HRSG systems (for example heat exchange elements or water condensation elements) between or among the screen layers. For fuel cell screens involving a plurality of layers, the fuel cells and flow paths in each layer of the fuel cell screen can be organized so substantially all of the gas flow in the HRSG passes through a fuel cell in one of the plurality of layers in order to reach locations downstream from the fuel cell screen.

In other aspects, other types of modifications can be provided for the molten carbonate fuel cells and/or the HRSG system. This can include reducing the $CO_2$ utilization to a lower value; modifying the HRSG to have a larger cross-sectional area relative to the gas turbine exhaust and relative to the cross section area at one or more of the heat exchangers; modifying the power density of the molten carbonate fuel cell, such as by operating the fuel cell at a voltage lower than the conventional operating voltage of about 0.75 or about 0.80 volts; modifying the shape or geometry of the fuel cell to decrease the cross-sectional area of the faces of the cathodes in the fuel cell stacks relative to the gas flow received and/or to accommodate a higher flow through the cathode; or a combination thereof.

In still other aspects, an HRSG can include multiple fuel cell screens. In such aspects, a first fuel cell screen can comprise a first plurality of molten carbonate fuel cells with cathodes operating in parallel, the first plurality of fuel cells optionally being arranged in multiple layers within the screen. The cathode exhaust from the first fuel cell screen can then be passed downstream within the HRSG to the cathode inlets of a second fuel cell screen comprising a second plurality of molten carbonate fuel cells with cathodes operating in parallel. The second plurality of fuel cells can be arranged in a single layer or in multiple layers within the second fuel cell screen.

Examples of Configurations for Incorporation of MCFCs into an HRSG

Turning now to FIG. 1, an example of a molten carbonate fuel cell (such as a stack or array of molten carbonate fuel cells) integrated into a heat recovery steam generator 100$a$ is shown, in accordance with an aspect of the present invention. An HRSG can use the heat from turbine exhaust to generate steam that can be used to generate electricity in a steam turbine. HRSG 100$a$ can comprise an inlet 102 through which exhaust gas 101 from the turbine (not shown) can enter the HRSG 100$a$. The interior of the HRSG 100$a$ can create a flow path for the exhaust gas. As used herein, the flow path may start at the inlet 102 and terminate at the outlet vent 120. Various components, such as heat exchangers, can be placed in the gas flow path to add or remove heat from the exhaust gas or to modify the turbine exhaust's chemistry.

The HRSG shown in FIG. 1 is an example of a configuration that includes elements found in many HRSG configurations, but other configurations for an HRSG could include additional elements, different elements, and/or fewer elements. In addition to conventional HRSG elements, the example of an HRSG shown in FIG. 1 can also include (for example) molten carbonate fuel cells, such as the fuel cell screen 150 shown in FIG. 1. The HRSG 100$a$ can include duct burner 104, fuel cell screen 150, a high-pressure heat exchanger 106, a selective catalyst reduction portion 110, an intermediate pressure heat exchanger 112, a low pressure heat exchanger 116, and outlet vent 120. The high-pressure heat exchanger 106 can generate high-pressure steam 108. The selective catalyst reduction portion 110 can remove $NO_x$, CO, and/or other compounds from the exhaust gas flow. The intermediate heat exchanger 112 can generate intermediate pressure steam 114. The low pressure heat exchanger 116 can generate low pressure steam 118. The cooled cathode exhaust gas 122 can exit the HRSG to the atmosphere through outlet vent 120. Because substantially all of the exhaust gas 101 passes through the cathode section of the fuel cell screen in the configuration shown in FIG. 1, the flow from the turbine prior to the fuel cell screen may be described as exhaust gas 101 and described as cathode exhaust gas 122 downstream of the fuel cell screen.

Figure 2:
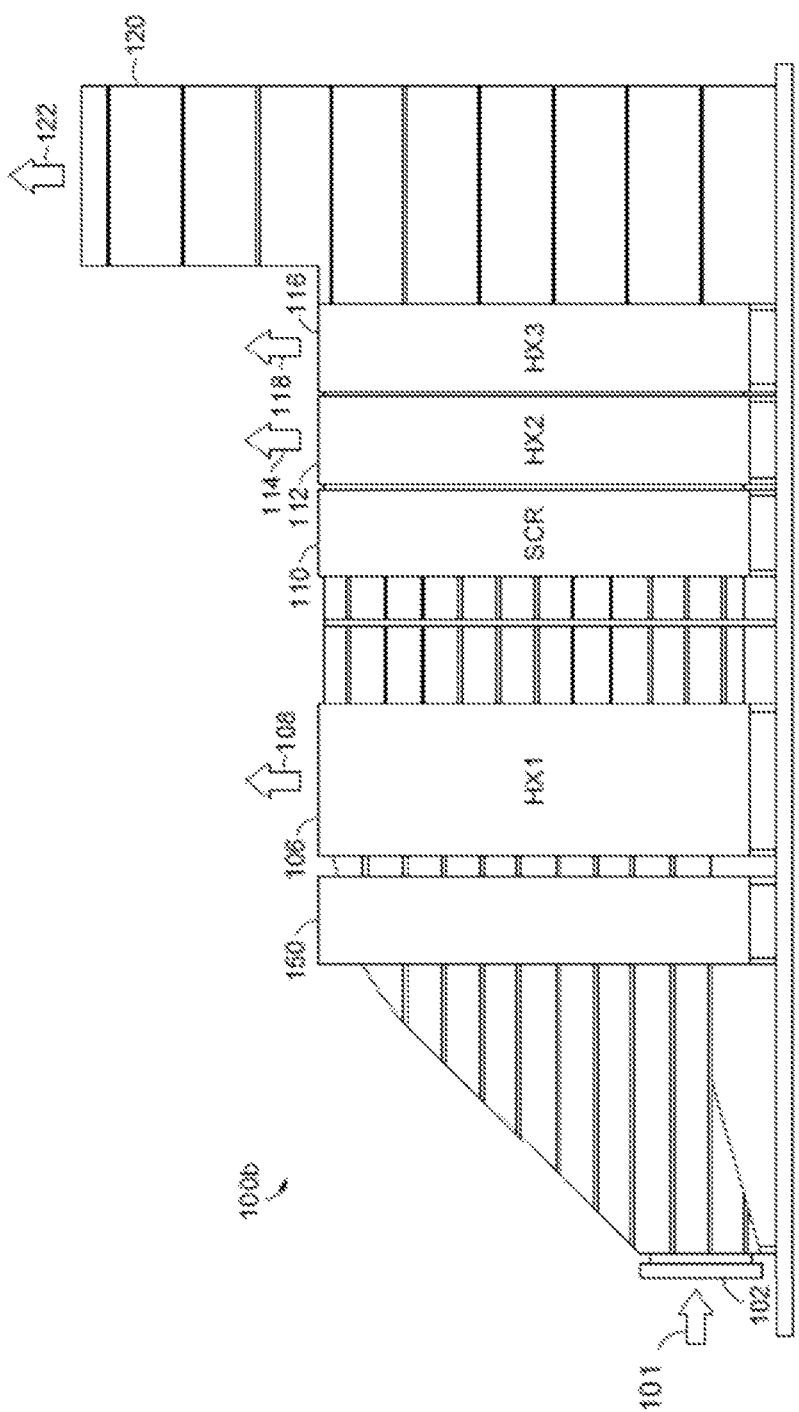
FIG. 2 schematically shows a molten carbonate integrated into a heat recovery steam generator before the first heat exchanger.

Turning now to FIG. 2, an alternative component arrangement for a HRSG 100b is illustrated, in accordance with an aspect of the present invention. HRSG 100b can include similar components to those described previously with reference to HRSG 100a, except that the duct burner 104 can be omitted. A duct burner 104 may be desirable in some, but not all implementations to heat the exhaust gas and/or to super heat steam in a heat exchanger incorporated into or adjacent to the duct burner 104. A duct burner can be sized to heat the exhaust gas to a temperature suitable for use in the molten carbonate fuel cells, taking into consideration heat added or removed by other components, if any, between the duct burner 104 and the fuel cell screen.

Figure 3:
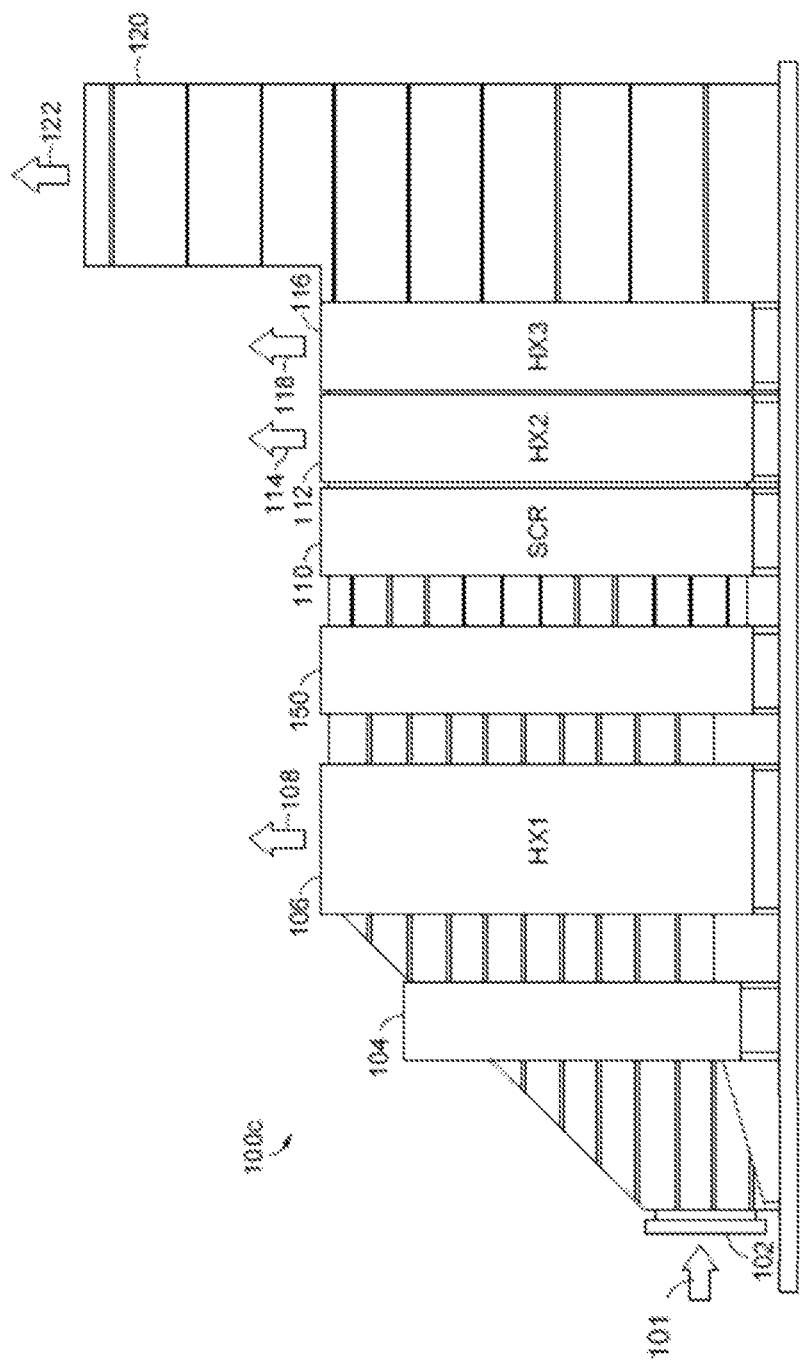
FIG. 3 schematically shows a molten carbonate fuel cell integrated into a heat recovery steam generator after the first heat exchanger.

Turning now to FIG. 3, still another alternative component arrangement for a HRSG 100c is illustrated, in accordance with an aspect of the present invention. HRSG 100c can include similar components as described previously with reference to HRSG 100a in FIG. 1. However, in the configuration shown in FIG. 3, the fuel cell screen 150 can be located downstream of the high-pressure heat exchanger 106 instead of upstream. In one aspect, the exhaust gas temperature after passing through the high-pressure heat exchanger 106 can be greater than about 500° C. The duct burner 104 may be sized in conjunction with the high-pressure heat exchanger 106 to ensure the exhaust gas leaving the high-pressure heat exchanger 106 is at a suitable temperature for use in a molten carbonate fuel cell.

Figure 5:
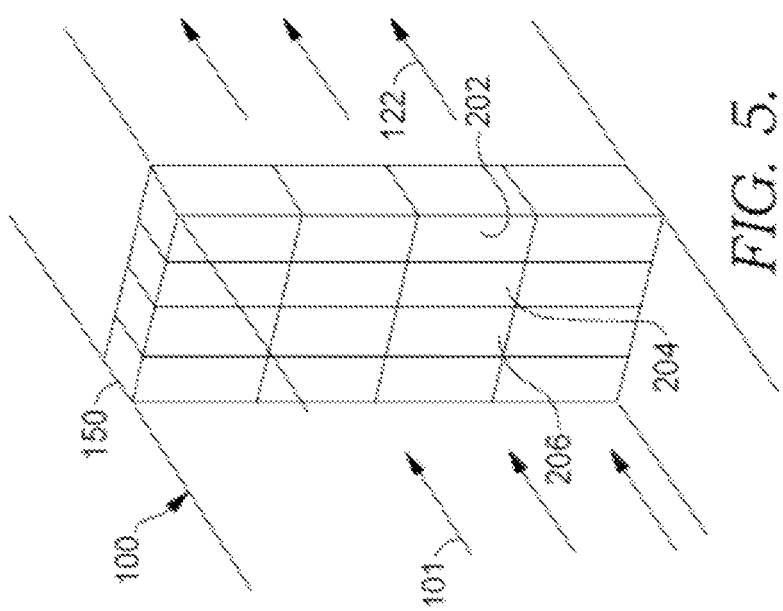
FIG. 5 schematically shows a perspective view of a screen comprising molten carbonate fuel cell stacks integrated into a heat recovery steam generator.

Turning now to FIG. 5, a perspective view of a fuel cell screen 150 is provided, in accordance with an aspect of the invention. The fuel cell screen 150 can be integrated with a HRSG 100. As illustrated above with reference to FIGS. 1-3, the fuel cell screen 150 may be integrated at different locations within the HRSG 100 in combination with different components. Fuel cell screen 150 can comprise a plurality of molten carbonate fuel cells including fuel cells 202, 204, and 206. The fuel cell screen 150 can substantially occupy the entire cross-sectional area of the flow path formed by the interior of the HRSG enclosure. Depending on the aspect, substantially occupying the entire cross-sectional area of a flow path can correspond to occupying at least about 95% of the cross-sectional area of a flow path, or at least about 98%, or at least about 99%. Additionally or alternately, substantially occupying the entire cross-sectional area can be defined based on the portion of a gas flow that passes through a cathode inlet (i.e., into a cathode) relative to the total gas flow passing through the cross-sectional area. For this type of definition, substantially occupying the entire cross-sectional area can correspond to having at least about 95 vol % of the gas flow passing through a cross-sectional area pass through a cathode inlet, or at least about about 98 vol % of the gas flow, or at least about 99 vol % of the gas flow. The fuel cell screen 150 can be arranged substantially perpendicular to the exhaust gas flow 101. Substantially all of the exhaust gas flow 101 can pass into cathode portions of the molten carbonate fuel cells within the fuel cell screen 150. The cathode exhaust gas 122 can form substantially the entire flow though the HRSG downstream of the fuel cell screen 150.

In one aspect, the cross-sectional area of the HRSG enclosure can be expanded leading to the fuel cell screen. The cross-sectional area may then be decreased downstream of the fuel cell screen. In one aspect, the cross-sectional area of the HRSG can be expanded to cause the exhaust gas to pass into the fuel cell screen with a reduced velocity relative to a typical velocity in an HRSG. For example, prior to expansion of the cross-sectional area, the received gas flow in the HRSG can have a superficial velocity of at least about 4 m/s, or at least about 5 m/s, or at least about 6 m/s. In some aspects, an expanded cross-sectional area of a HRSG prior to a fuel cell screen can allow the space velocity of the gas impinging on the fuel cell screen to be about 5 m/s or less, or about 4 m/s or less, or about 3 m/s or less, or about 2 m/s or less, or about 1 m/s. Additionally or alternately, the space velocity of the gas impinging on the fuel cell screen can be at least about 0.25 m/s, or at least about 0.5 m/s, or at least about 1 m/s, or at least about 2 m/s, or at least about 3 m/s, or at least about 4 m/s. Each of the above lower bounds for the space velocity is explicitly contemplated in combination with each of the above upper bounds. Thus, ranges for the space velocity that are contemplated by the above upper and lower bounds include, but are not limited to, about 0.25 m/s to about 5 m/s, or about 0.5 m/s to about 5 m/s, or about 0.5 m/s to about 4 m/s, or about 0.5 m/s to about 3 m/s, or about 1 m/s to about 4 m/s, or about 1 m/s to about 3 m/s, or about 1 m/s to about 5 m/s, or about 2 m/s to about 5 m/s, or about 2 m/s to about 4 m/s. After passing through the fuel cell screen, the cross-sectional area of the HRSG can be reduced to cause the cathode exhaust 122 to pass through the heat exchangers at a space velocity greater than the space velocity of the gas flow impinging on the cathode inlets, such as at least about 4 m/s, or at least about 5 m/s, or at least about 5.5 m/s, or at least about 6 m/s.

Figure 6:
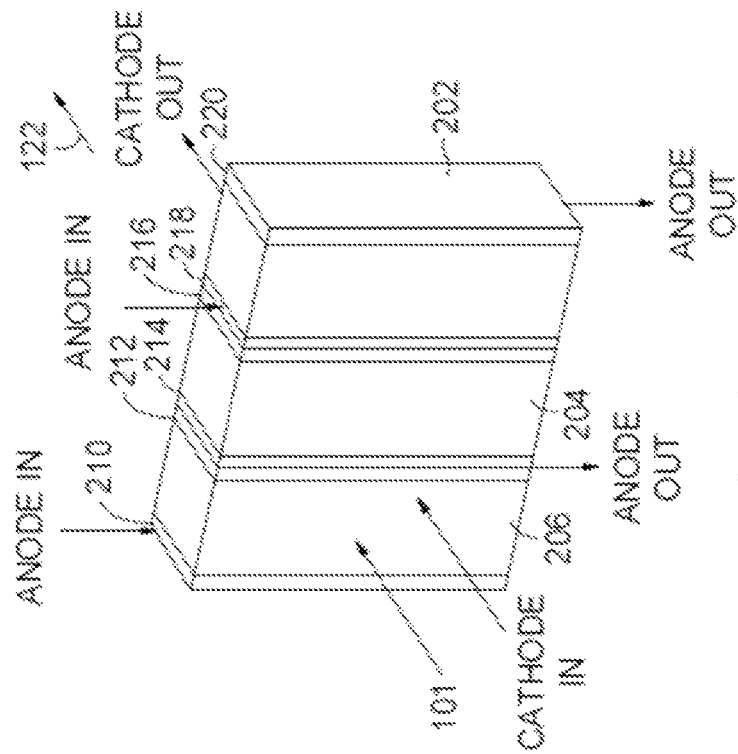
FIG. 6 schematically shows an arrangement of anode manifolds connected to a plurality of molten carbonate fuel cell stacks within the screen.

Turning now to FIG. 6, a perspective view of fuel cell stacks 202, 204, and 206 within the fuel cell screen 150 is provided, in accordance with an aspect of the invention. The fuel cell stacks can comprise a plurality of fuel cells each having an anode section and cathode section. As can be seen, the direction of the anode flow and the cathode flow can be different. For example, the cathode inlet portion and cathode outlet portions of the fuel cells can be exposed to the flow path inside the HRSG. In the configuration shown in FIG. 6, the anode fuel can be provided to fuel cell stack 206 by anode inlet manifold 210 which is separate from the primary flow path within the HRSG. The anode exhaust from fuel cell stack 206 can be received by anode exhaust manifold 212. This illustrates that the anode flow can be substantially perpendicular to the cathode flow.

Anode inlet manifold 214 can provide fuel to the anodes of fuel cell stack 204 and the corresponding anode exhaust can be received by anode exhaust manifold 216. Anode inlet manifold 218 can provide fuel for fuel cell stack 202 and the corresponding anode exhaust can be received by anode exhaust manifold 220. In one aspect, the anode inlet manifold can serve multiple rows of molten carbonate fuel cell stacks within the fuel cell screen 150. Similarly, the anode outlet manifold can serve multiple rows of fuel cell stacks within the fuel cell screen 150.

Turning now to FIG. 7, a top view of a single layer fuel cell screen 225 is illustrated, in accordance with an aspect of the invention. As with screen 150, screen 225 resides within a HRSG. Screen 225 illustrates a different manifold arrangement from the anode manifold arrangement used with screen 150. FIG. 7 illustrates a screen 225 comprising seven columns of fuel cells (i.e., 240, 241, 242, 243, 244, 245, and 246) separated by six anode manifolds (i.e., 230, 231, 232, 233, 234, and 235), with two additional anode manifolds (229 and 236) between the end columns (230 and 235) and the boundary of the HRSG. The anode manifolds (230, 231, 232, 233, 234, and 235) located between columns serve two adjacent columns. For example, anode manifold 230 can provide fuel to the anode inlets of the fuel cell columns 240 and 241. Manifolds 229, 231, 233, 235 may service the anode inlets, and manifolds 230, 232, 234, and 236 can service the anode outlets.

As mentioned, a fuel cell screen can comprise one or more layers of fuel cells and/or fuel cell stacks. As can be seen, the fuel cell screen 225 can be oriented to receive the entire exhaust gas flow 101. In one aspect, a bypass through the screen or around the screen is not provided within the HRSG enclosure.

Turning now to FIG. 8, a multi-layer fuel cell screen 240 is provided, in accordance with an aspect of the invention. The multi-layer screen 240 can comprise two layers of fuel cells that process the exhaust gas in parallel. Though not shown, alternatively or additionally, a multi-layer fuel cell screen can be arranged for serial processing of exhaust gas. With serial processing, the cathode exhaust from an upstream layer is passed into the cathode inlets of fuel cells in the downstream layer. In another configuration option, multi-layer fuel screen 240 can include a plurality of layers of fuel cells, such as 2 or more layers, or 3 or more layers.

In the configuration shown in FIG. 8, the upstream layer 250 comprises five columns of molten carbonate fuel cells and/or multiple fuel cell stacks. Fuel cell columns 252, 254, 256, 258, and 260 can be located within the upstream layer 250. The downstream layer 270 can comprise molten carbonate fuel cell columns 270, 272, 274, 276, and 278. Gaps can be provided between the columns in layer 250 to allow exhaust gases to flow into the cathode portion of fuel cells located within layer 270. For example, gap 251 can allow a portion of exhaust gas 253 to bypass the upstream layer 250 and entered the cathodes of fuel cell column 272. Similarly, a gap can be provided between fuel cell columns in the downstream layer 270 to allow cathode exhaust from the upstream layer to bypass the downstream layer. For example, gap 273 can allow cathode exhaust gas from fuel cell column 256 to bypass the downstream layer 270.

Anode inlet manifolds and anode outlet manifolds may be provided within the columns, exterior to the columns, or both interior and exterior to the columns. Fuel cell column 256 can be fluidly connected to anode inlet manifold 293 and anode outlet manifold 294. Alternatively or additionally, external anode manifolds 280 and 281 may connect to anode inlet and anode outlet manifolds integrated into fuel cell column 260. External anode inlet manifold 282 and external anode exhaust manifold 283 can service the integrated anode supply and exhaust manifolds of fuel cell column 276.

Support block 262 can work in conjunction with baffle 263 to direct exhaust gases to the cathode of fuel cell column 278. Other baffles and blocks (e.g., block 264) can be provided to guide exhaust gas into the cathode portions of the downstream layer and guide cathode exhaust from the upstream layer passed the downstream layer.

Alternative Configurations

Other options for increasing the amount of gas-turning-exhaust $CO_2$ captured in the MCFC can be based on modification of other aspects of an MCFC. Such alternative modifications can include, for example, increasing the length of the flow path of a gas flow passing through a cathode.

Another additional configuration is for applications not to gas turbines, but to other $CO_2$ sources, such as from boilers or furnaces. In these cases, the total exhaust flow rate from the furnace or boiler may be substantially less per $CO_2$ to be consumed by the fuel cell, as the concentration of $CO_2$ may be substantially higher. Additional details related to operation of molten carbonate fuel cells with other $CO_2$ sources, such as cement production, can be found, for example, in U.S. application Ser. No. 14/207,728, the relevant contents of which are incorporated herein by reference.

Still another additional configuration is a configuration that is comprised only of fuel cells. In this case, the cathode inlet air is not from a gas turbine or boiler or furnace, but is a burner that receives air and fuel from the anodes. For stack arrangements including a plurality of fuel cell stacks, such as arrangements of more than 5 stacks, or more than 10 stacks, or more than 20 stacks, the arrangement as described in this application can provide a more efficient manifold concept for effective distribution of the received gas flow in the HRSG to all of the stacks. More generally, any convenient number of fuel stacks can be incorporated in the plurality of fuel cell stacks, with the plurality of fuel cell stacks possibly including up to 100 stacks, or up to 500 stacks, or up to 1000 stacks, or more.

Definitions

Syngas: In this description, syngas is defined as mixture of $H_2$ and CO in any ratio. Optionally, $H_2O$ and/or $CO_2$ may be present in the syngas. Optionally, inert compounds (such as .Nitrogen) and residual reformable fuel compounds may be present in the syngas. If components other than $H_2$ and CO are present in the syngas, the combined volume percentage of $H_2$ and CO in the syngas can be at least 25 vol % relative to the total volume of the syngas, such as at least 40 vol %, or at least 50 vol %, or at least 60 vol %. Additionally or alternately, the combined volume percentage of $H_2$ and CO in the syngas can be 100 vol % or less, such as 95 vol % or less or 90 vol % or less.

Reformable fuel: A reformable fuel is defined as a fuel that contains carbon-hydrogen bonds that can be reformed to generate $H_2$. Hydrocarbons are examples of reformable fuels, as are other hydrocarbonaceous compounds such as alcohols. Although CO and $H_2O$ can participate in a water gas shift reaction to form hydrogen, CO is not considered a reformable fuel under this definition.

Reformable hydrogen content: The reformable hydrogen content of a fuel is defined as the number of $H_2$ molecules that can be derived from a fuel by reforming the fuel and then driving the water gas shift reaction to completion to maximize $H_2$ production. It is noted that $H_2$ by definition has a reformable hydrogen content of 1, although $H_2$ itself is not defined as a reformable fuel herein. Similarly, CO has a reformable hydrogen content of 1. Although CO is not strictly reformable, driving the water gas shift reaction to completion will result in exchange of a CO for an $H_2$. As examples of reformable hydrogen content for reformable fuels, the reformable hydrogen content of methane is 4 $H_2$ molecules while the reformable hydrogen content of ethane is 7 $H_2$ molecules. More generally, if a fuel has the composition $CxHyOz$, then the reformable hydrogen content of the fuel at 100% reforming and water-gas shift is $n(H_2 \text{ max reforming}) = 2x + y/2 - z$. Based on this definition, fuel utilization within a cell can then be expressed as $n(H_2 \text{ ox})/n(H_2 \text{ max reforming})$ Of course, the reformable hydrogen content of a mixture of components can be determined based on the reformable hydrogen content of the individual components.

The reformable hydrogen content of compounds that contain other heteroatoms, such as oxygen, sulfur or nitrogen, can also be calculated in a similar manner.

Oxidation Reaction: In this discussion, the oxidation reaction within the anode of a fuel cell is defined as the reaction corresponding to oxidation of $H_2$ by reaction with $CO_3^{2-}$ to form $H_2O$ and $CO_2$. It is noted that the reforming reaction within the anode, where a compound containing a carbon-hydrogen bond is converted into $H_2$ and CO or $CO_2$, is excluded from this definition of the oxidation reaction in the anode. The water-gas shift reaction is similarly outside of this definition of the oxidation reaction. It is further noted that references to a combustion reaction are defined as references to reactions where $H_2$ or a compound containing carbon-hydrogen bond(s) are reacted with $O_2$ to form $H_2O$ and carbon oxides in a non-electrochemical burner, such as the combustion zone of a combustion-powered generator.

Aspects of the invention can adjust anode fuel parameters to achieve a desired operating range for the fuel cell. Anode fuel parameters can be characterized directly, and/or in relation to other fuel cell processes in the form of one or more ratios. For example, the anode fuel parameters can be controlled to achieve one or more ratios including a fuel utilization, a fuel cell heating value utilization, a fuel surplus ratio, a reformable fuel surplus ratio, a reformable hydrogen content fuel ratio, and combinations thereof.

Fuel utilization: Fuel utilization is an option for characterizing operation of the anode based on the amount of oxidized fuel relative to the reformable hydrogen content of an input stream can be used to define a fuel utilization for a fuel cell. In this discussion, "fuel utilization" is defined as the ratio of the amount of hydrogen oxidized in the anode for production of electricity (as described above) versus the reformable hydrogen content of the anode input (including any associated reforming stages). Reformable hydrogen content has been defined above as the number of $H_2$ molecules that can be derived from a fuel by reforming the fuel and then driving the water gas shift reaction to completion to maximize $H_2$ production. For example, each methane introduced into an anode and exposed to steam reforming conditions results in generation of the equivalent of 4 $H_2$ molecules at max production. (Depending on the reforming and/or anode conditions, the reforming product can correspond to a non-water gas shifted product, where one or more of the $H_2$ molecules is present instead in the form of a CO molecule.) Thus, methane is defined as having a reformable hydrogen content of 4 $H_2$ molecules. As another example, under this definition ethane has a reformable hydrogen content of 7 $H_2$ molecules.

The utilization of fuel in the anode can also be characterized by defining a heating value utilization based on a ratio of the Lower Heating Value of hydrogen oxidized in the anode due to the fuel cell anode reaction relative to the Lower Heating Value of all fuel delivered to the anode and/or a reforming stage associated with the anode. The "fuel cell heating value utilization" as used herein can be computed using the flow rates and Lower Heating Value (LHV) of the fuel components entering and leaving the fuel cell anode. As such, fuel cell heating value utilization can be computed as (LHV(anode_in)−LHV(anode_out))/LHV(anode_in), where LHV(anode_in) and LHV(anode_out) refer to the LHV of the fuel components (such as $H_2$, $CH_4$, and/or CO) in the anode inlet and outlet streams or flows, respectively. In this definition, the LHV of a stream or flow may be computed as a sum of values for each fuel component in the input and/or output stream. The contribution of each fuel component to the sum can correspond to the fuel component's flow rate (e.g., mol/hr) multiplied by the fuel component's LHV (e.g., joules/mol).

Lower Heating Value: The lower heating value is defined as the enthalpy of combustion of a fuel component to vapor phase, fully oxidized products (i.e., vapor phase $CO_2$ and $H_2O$ product). For example, any $CO_2$ present in an anode input stream does not contribute to the fuel content of the anode input, since $CO_2$ is already fully oxidized. For this definition, the amount of oxidation occurring in the anode due to the anode fuel cell reaction is defined as oxidation of $H_2$ in the anode as part of the electrochemical reaction in the anode, as defined above.

It is noted that, for the special case where the only fuel in the anode input flow is $H_2$, the only reaction involving a fuel component that can take place in the anode represents the conversion of $H_2$ into $H_2O$. In this special case, the fuel utilization simplifies to ($H_2$-rate-in minus $H_2$-rate-out)/$H_2$-rate-in. In such a case, $H_2$ would be the only fuel component, and so the $H_2$ LHV would cancel out of the equation. In the more general case, the anode feed may contain, for example, $CH_4$, $H_2$, and CO in various amounts. Because these species can typically be present in different amounts in the anode outlet, the summation as described above can be needed to determine the fuel utilization.

Alternatively or in addition to fuel utilization, the utilization for other reactants in the fuel cell can be characterized. For example, the operation of a fuel cell can additionally or alternately be characterized with regard to "$CO_2$ utilization" and/or "oxidant" utilization. The values for $CO_2$ utilization and/or oxidant utilization can be specified in a similar manner.

Fuel surplus ratio: Still another way to characterize the reactions in a molten carbonate fuel cell is by defining a utilization based on a ratio of the Lower Heating Value of all fuel delivered to the anode and/or a reforming stage associated with the anode relative to the Lower Heating Value of hydrogen oxidized in the anode due to the fuel cell anode reaction. This quantity will be referred to as a fuel surplus ratio. As such the fuel surplus ratio can be computed as (LHV(anode_in)/(LHV(anode_in)−LHV(anode_out)) where LHV(anode_in) and LHV(anode_out) refer to the LHV of the fuel components (such as $H_2$, $CH_4$, and/or CO) in the anode inlet and outlet streams or flows, respectively. In various aspects of the invention, a molten carbonate fuel cell can be operated to have a fuel surplus ratio of at least about 1.0, such as at least about 1.5, or at least about 2.0, or at least about 2.5, or at least about 3.0, or at least about 4.0. Additionally or alternately, the fuel surplus ratio can be about 25.0 or less.

It is noted that not all of the reformable fuel in the input stream for the anode may be reformed. Preferably, at least about 90% of the reformable fuel in the input stream to the anode (and/or into an associated reforming stage) can be reformed prior to exiting the anode, such as at least about 95% or at least about 98%. In some alternative aspects, the amount of reformable fuel that is reformed can be from about 75% to about 90%, such as at least about 80%.

The above definition for fuel surplus ratio provides a method for characterizing the amount of reforming occurring within the anode and/or reforming stage(s) associated with a fuel cell relative to the amount of fuel consumed in the fuel cell anode for generation of electric power.

Optionally, the fuel surplus ratio can be modified to account for situations where fuel is recycled from the anode output to the anode input. When fuel (such as $H_2$, CO, and/or unreformed or partially reformed hydrocarbons) is recycled from anode output to anode input, such recycled fuel components do not represent a surplus amount of reformable or reformed fuel that can be used for other purposes. Instead, such recycled fuel components merely indicate a desire to reduce fuel utilization in a fuel cell.

Reformable fuel surplus ratio: Calculating a reformable fuel surplus ratio is one option to account for such recycled fuel components is to narrow the definition of surplus fuel, so that only the LHV of reformable fuels is included in the input stream to the anode. As used herein the "reformable fuel surplus ratio" is defined as the Lower Heating Value of reformable fuel delivered to the anode and/or a reforming stage associated with the anode relative to the Lower Heating Value of hydrogen oxidized in the anode due to the fuel cell anode reaction. Under the definition for reformable fuel surplus ratio, the LHV of any $H_2$ or CO in the anode input is excluded. Such an LHV of reformable fuel can still be measured by characterizing the actual composition entering a fuel cell anode, so no distinction between recycled components and fresh components needs to be made. Although some non-reformed or partially reformed fuel may also be recycled, in most aspects the majority of the fuel recycled to the anode can correspond to reformed products such as $H_2$ or CO. Expressed mathematically, the reformable fuel surplus ratio $(R_{RFS})=LHV_{RF}/LHV_{OH}$, where $LHV_{RF}$ is the Lower Heating Value (LHV) of the reformable fuel and $LHV_{OH}$ is the Lower Heating Value (LHV) of the hydrogen oxidized in the anode. The LHV of the hydrogen oxidized in the anode may be calculated by subtracting the LHV of the anode outlet stream from the LHV of the anode inlet stream (e.g., LHV(anode_in)−LHV(anode_out)). In various aspects of the invention, a molten carbonate fuel cell can be operated to have a reformable fuel surplus ratio of at least about 0.25, such as at least about 0.5, or at least about 1.0, or at least about 1.5, or at least about 2.0, or at least about 2.5, or at least about 3.0, or at least about 4.0. Additionally or alternately, the reformable fuel surplus ratio can be about 25.0 or less. It is noted that this narrower definition based on the amount of reformable fuel delivered to the anode relative to the amount of oxidation in the anode can distinguish between two types of fuel cell operation methods that have low fuel utilization. Some fuel cells achieve low fuel utilization by recycling a substantial portion of the anode output back to the anode input. This recycle can allow any hydrogen in the anode input to be used again as an input to the anode. This can reduce the amount of reforming, as even though the fuel utilization is low for a single pass through the fuel cell, at least a portion of the unused fuel is recycled for use in a later pass. Thus, fuel cells with a wide variety of fuel utilization values may have the same ratio of reformable fuel delivered to the anode reforming stage(s) versus hydrogen oxidized in the anode reaction. In order to change the ratio of reformable fuel delivered to the anode reforming stages relative to the amount of oxidation in the anode, either an anode feed with a native content of non-reformable fuel needs to be identified, or unused fuel in the anode output needs to be withdrawn for other uses, or both. Additional details related to operation of molten carbonate fuel cells at various combinations of fuel utilization and $CO_2$ utilization can be found, for example, in U.S. application Ser. No. 14/207,691, the relevant contents of which are incorporated herein by reference.

Reformable hydrogen surplus ratio: Still another option for characterizing the operation of a fuel cell is based on a "reformable hydrogen surplus ratio." The reformable fuel surplus ratio defined above is defined based on the lower heating value of reformable fuel components. The reformable hydrogen surplus ratio is defined as the reformable hydrogen content of reformable fuel delivered to the anode and/or a reforming stage associated with the anode relative to the hydrogen reacted in the anode due to the fuel cell anode reaction. As such, the "reformable hydrogen surplus ratio" can be computed as (RFC(reformable_anode_in)/ (RFC(reformable_anode_in)−RFC(anode_out)), where RFC(reformable_anode_in) refers to the reformable hydrogen content of reformable fuels in the anode inlet streams or flows, while RFC (anode_out) refers to the reformable hydrogen content of the fuel components (such as $H_2$, $CH_4$, and/or CO) in the anode inlet and outlet streams or flows. The RFC can be expressed in moles/s, moles/hr, or similar. An example of a method for operating a fuel cell with a large ratio of reformable fuel delivered to the anode reforming stage(s) versus amount of oxidation in the anode can be a method where excess reforming is performed in order to balance the generation and consumption of heat in the fuel cell. Reforming a reformable fuel to form $H_2$ and CO is an endothermic process. This endothermic reaction can be countered by the generation of electrical current in the fuel cell, which can also produce excess heat corresponding (roughly) to the difference between the amount of heat generated by the anode oxidation reaction and the carbonate formation reaction and the energy that exits the fuel cell in the form of electric current. The excess heat per mole of hydrogen involved in the anode oxidation reaction/carbonate formation reaction can be greater than the heat absorbed to generate a mole of hydrogen by reforming As a result, a fuel cell operated under conventional conditions can exhibit a temperature increase from inlet to outlet. Instead of this type of conventional operation, the amount of fuel reformed in the reforming stages associated with the anode can be increased. For example, additional fuel can be reformed so that the heat generated by the exothermic fuel cell reactions can be (roughly) balanced by the heat consumed in reforming, or even the heat consumed by reforming can be beyond the excess heat generated by the fuel oxidation, resulting in a temperature drop across the fuel cell. This can result in a substantial excess of hydrogen relative to the amount needed for electrical power generation. As one example, a feed to the anode inlet of a fuel cell or an associated reforming stage can be substantially composed of reformable fuel, such as a substantially pure methane feed. During conventional operation for electric power generation using such a fuel, a molten carbonate fuel cell can be operated with a fuel utilization of about 75%. This means that about 75% (or ¾) of the fuel content delivered to the anode is used to form hydrogen that is then reacted in the anode with carbonate ions to form $H_2O$ and $CO_2$. In conventional operation, the remaining about 25% of the fuel content can be reformed to $H_2$ within the fuel cell (or can pass through the fuel cell unreacted for any CO or $H_2$ in the fuel), and then combusted outside of the fuel cell to form $H_2O$ and $CO_2$ to provide heat for the cathode inlet to the fuel cell. The reformable hydrogen surplus ratio in this situation can be 4/(4−1)=4/3. Additional details related to operation of molten carbonate fuel cells at various reformable surplus ratios as described herein can be found, for example, in U.S. application Ser. No. 14/207,696, the relevant contents of which are incorporated herein by reference.

Electrical efficiency: As used herein, the term "electrical efficiency" ("EE") is defined as the electrochemical power produced by the fuel cell divided by the rate of Lower Heating Value ("LHV") of fuel input to the fuel cell. The fuel inputs to the fuel cell includes both fuel delivered to the anode as well as any fuel used to maintain the temperature of the fuel cell, such as fuel delivered to a burner associated with a fuel cell. In this description, the power produced by the fuel may be described in terms of LHV(el) fuel rate.

Electrochemical power: As used herein, the term "electrochemical power" or LHV(el) is the power generated by the circuit connecting the cathode to the anode in the fuel cell and the transfer of carbonate ions across the fuel cell's electrolyte. Electrochemical power excludes power produced or consumed by equipment upstream or downstream from the fuel cell. For example, electricity produced from heat in a fuel cell exhaust stream is not considered part of the electrochemical power. Similarly, power generated by a gas turbine or other equipment upstream of the fuel cell is not part of the electrochemical power generated. The "electrochemical power" does not take electrical power consumed during operation of the fuel cell into account, or any loss incurred by conversion of the direct current to alternating current. In other words, electrical power used to supply the fuel cell operation or otherwise operate the fuel cell is not subtracted from the direct current power produced by the fuel cell. As used herein, the power density is the current density multiplied by voltage. As used herein, the total fuel cell power is the power density multiplied by the fuel cell area.

Fuel inputs: As used herein, the term "anode fuel input," designated as LHV(anode_in), is the amount of fuel within the anode inlet stream. The term "fuel input", designated as LHV(in), is the total amount of fuel delivered to the fuel cell, including both the amount of fuel within the anode inlet stream and the amount of fuel used to maintain the temperature of the fuel cell. The fuel may include both reformable and nonreformable fuels, based on the definition of a reformable fuel provided herein. Fuel input is not the same as fuel utilization.

Total fuel cell efficiency: As used herein, the term "total fuel cell efficiency" ("TFCE") is defined as: the electrochemical power generated by the fuel cell, plus the rate of LHV of syngas produced by the fuel cell, divided by the rate of LHV of fuel input to the anode. In other words, TFCE= (LHV(el)+LHV(sg net))/LHV(anode_in), where LHV(anode_in) refers to rate at which the LHV of the fuel components (such as $H_2$, $CH_4$, and/or CO) delivered to the anode and LHV(sg net) refers to a rate at which syngas ($H_2$, CO) is produced in the anode, which is the difference between syngas input to the anode and syngas output from the anode. LHV(el) describes the electrochemical power generation of the fuel cell. The total fuel cell efficiency excludes heat generated by the fuel cell that is put to beneficial use outside of the fuel cell. In operation, heat generated by the fuel cell may be put to beneficial use by downstream equipment. For example, the heat may be used to generate additional electricity or to heat water. These uses, when they occur apart from the fuel cell, are not part of the total fuel cell efficiency, as the term is used in this application. The total fuel cell efficiency is for the fuel cell operation only, and does not include power production, or consumption, upstream, or downstream, of the fuel cell. Additional details related to operation of molten carbonate fuel cells at increased values of total fuel cell efficiency can be found, for example, in U.S. application Ser. No. 14/207,698, the relevant contents of which are incorporated herein by reference.

Chemical efficiency: As used herein, the term "chemical efficiency", is defined as the lower heating value of $H_2$ and CO in the anode exhaust of the fuel cell, or LHV(sg out), divided by the fuel input, or LHV(in).

Neither the electrical efficiency nor the total system efficiency takes the efficiency of upstream or downstream processes into consideration. For example, it may be advantageous to use turbine exhaust as a source of $CO_2$ for the fuel cell cathode. In this arrangement, the efficiency of the turbine is not considered as part of the electrical efficiency or the total fuel cell efficiency calculation. Similarly, outputs from the fuel cell may be recycled as inputs to the fuel cell. A recycle loop is not considered when calculating electrical efficiency or the total fuel cell efficiency in single pass mode.

Syngas produced: As used herein, the term "syngas produced" is the difference between syngas input to the anode and syngas output from the anode. Syngas may be used as an input, or fuel, for the anode, at least in part. For example, a system may include an anode recycle loop that returns syngas from the anode exhaust to the anode inlet where it is supplemented with natural gas or other suitable fuel. Syngas produced LHV (sg net)=(LHV(sg out)–LHV(sg in)), where LHV(sg in) and LHV(sg out) refer to the LHV of the syngas in the anode inlet and syngas in the anode outlet streams or flows, respectively. It is noted that at least a portion of the syngas produced by the reforming reactions within an anode can typically be utilized in the anode to produce electricity. The hydrogen utilized to produce electricity is not included in the definition of "syngas produced" because it does not exit the anode. As used herein, the term "syngas ratio" is the LHV of the net syngas produced divided by the LHV of the fuel input to the anode or LHV (sg net)/LHV(anode in). Molar flow rates of syngas and fuel can be used instead of LHV to express a molar-based syngas ratio and a molar-based syngas produced. Additional details related to operation of molten carbonate fuel cells with increased syngas production can be found, for example, in U.S. application Ser. No. 14/207,706, the relevant contents of which are incorporated herein by reference.

Steam to carbon ratio (S/C): As used herein, the steam to carbon ratio (S/C) is the molar ratio of steam in a flow to reformable carbon in the flow. Carbon in the form of CO and $CO_2$ are not included as reformable carbon in this definition. The steam to carbon ratio can be measured and/or controlled at different points in the system. For example, the composition of an anode inlet stream can be manipulated to achieve a S/C that is suitable for reforming in the anode. The S/C can be given as the molar flow rate of $H_2O$ divided by the product of the molar flow rate of fuel multiplied by the number of carbon atoms in the fuel, e.g. one for methane. Thus, S/C=$f_{H2O}/(f_{CH4}$ X #C), where $f_{H2O}$ is the molar flow rate of water, where $f_{CH4}$ is the molar flow rate of methane (or other fuel) and #C is the number of carbons in the fuel.

Fuel Cell and Fuel Cell Components: In this discussion, a fuel cell can correspond to a single cell, with an anode and a cathode separated by an electrolyte. The anode and cathode can receive input gas flows to facilitate the respective anode and cathode reactions for transporting charge across the electrolyte and generating electricity. A fuel cell stack can represent a plurality of cells in an integrated unit. Although a fuel cell stack can include multiple fuel cells, the fuel cells can typically be connected in parallel and can function (approximately) as if they collectively represented a single fuel cell of a larger size. When an input flow is delivered to the anode or cathode of a fuel cell stack, the fuel stack can include flow channels for dividing the input flow between each of the cells in the stack and flow channels for combining the output flows from the individual cells. In this discussion, a fuel cell array can be used to refer to a plurality of fuel cells (such as a plurality of fuel cell stacks) that are arranged in series, in parallel, or in any other convenient manner (e.g., in a combination of series and parallel). A fuel cell array can include one or more stages of fuel cells and/or fuel cell stacks, where the anode/cathode output from a first stage may serve as the anode/cathode input for a second stage. It is noted that the anodes in a fuel cell array do not have to be connected in the same way as the cathodes in the array. For convenience, the input to the first anode stage of a fuel cell array may be referred to as the anode input for the array, and the input to the first cathode stage of the fuel cell array may be referred to as the cathode input to the array. Similarly, the output from the final anode/cathode stage may be referred to as the anode/cathode output from the array.

It should be understood that reference to use of a fuel cell herein typically denotes a "fuel cell stack" composed of individual fuel cells, and more generally refers to use of one or more fuel cell stacks in fluid communication. Individual fuel cell elements (plates) can typically be "stacked" together in a rectangular array called a "fuel cell stack". This fuel cell stack can typically take a feed stream and distribute reactants among all of the individual fuel cell elements and can then collect the products from each of these elements. When viewed as a unit, the fuel cell stack in operation can be taken as a whole even though composed of many (often tens or hundreds) of individual fuel cell elements. These individual fuel cell elements can typically have similar voltages (as the reactant and product concentrations are similar), and the total power output can result from the summation of all of the electrical currents in all of the cell elements, when the elements are electrically connected in series. Stacks can also be arranged in a series arrangement to produce high voltages. A parallel arrangement can boost the current. If a sufficiently large volume fuel cell stack is available to process a given exhaust flow, the systems and methods described herein can be used with a single molten carbonate fuel cell stack. In other aspects of the invention, a plurality of fuel cell stacks may be desirable or needed for a variety of reasons.

For the purposes of this invention, unless otherwise specified, the term "fuel cell" should be understood to also refer to and/or is defined as including a reference to a fuel cell stack composed of set of one or more individual fuel cell elements for which there is a single input and output, as that is the manner in which fuel cells are typically employed in practice. Similarly, the term fuel cells (plural), unless otherwise specified, should be understood to also refer to and/or is defined as including a plurality of separate fuel cell stacks. In other words, all references within this document, unless specifically noted, can refer interchangeably to the operation of a fuel cell stack as a "fuel cell". For example, the volume of exhaust generated by a commercial scale combustion generator may be too large for processing by a fuel cell (i.e., a single stack) of conventional size. In order to process the full exhaust, a plurality of fuel cells (i.e., two or more separate fuel cells or fuel cell stacks) can be arranged in parallel, so that each fuel cell can process (roughly) an equal portion of the combustion exhaust. Although multiple fuel cells can be used, each fuel cell can typically be operated in a generally similar manner, given its (roughly) equal portion of the combustion exhaust.

"Internal reforming" and "external reforming": A fuel cell or fuel cell stack may include one or more internal reforming sections. As used herein, the term "internal reforming" refers to fuel reforming occurring within the body of a fuel cell, a fuel cell stack, or otherwise within a fuel cell assembly. External reforming, which is often used in conjunction with a fuel cell, occurs in a separate piece of equipment that is located outside of the fuel cell stack. In other words, the body of the external reformer is not in direct physical contact with the body of a fuel cell or fuel cell stack. In a typical set up, the output from the external reformer can be fed to the anode inlet of a fuel cell. Unless otherwise noted specifically, the reforming described within this application is internal reforming.

Internal reforming may occur within a fuel cell anode. Internal reforming can additionally or alternately occur within an internal reforming element integrated within a fuel cell assembly. The integrated reforming element may be located between fuel cell elements within a fuel cell stack. In other words, one of the trays in the stack can be a reforming section instead of a fuel cell element. In one aspect, the flow arrangement within a fuel cell stack directs fuel to the internal reforming elements and then into the anode portion of the fuel cells. Thus, from a flow perspective, the internal reforming elements and fuel cell elements can be arranged in series within the fuel cell stack. As used herein, the term "anode reforming" is fuel reforming that occurs within an anode. As used herein, the term "internal reforming" is reforming that occurs within an integrated reforming element and not in an anode section.

In some aspects, a reforming stage that is internal to a fuel cell assembly can be considered to be associated with the anode(s) in the fuel cell assembly. In some alternative aspects, for a reforming stage in a fuel cell stack that can be associated with an anode (such as associated with multiple anodes), a flow path can be available so that the output flow from the reforming stage is passed into at least one anode. This can correspond to having an initial section of a fuel cell plate that is not in contact with the electrolyte and instead serves just as a reforming catalyst. Another option for an associated reforming stage can be to have a separate integrated reforming stage as one of the elements in a fuel cell stack, where the output from the integrated reforming stage is returned to the input side of one or more of the fuel cells in the fuel cell stack.

From a heat integration standpoint, a characteristic height in a fuel cell stack can be the height of an individual fuel cell stack element. It is noted that the separate reforming stage or a separate endothermic reaction stage could have a different height in the stack than a fuel cell. In such a scenario, the height of a fuel cell element can be used as the characteristic height. In some aspects, an integrated endothermic reaction stage can be defined as a stage that is heat integrated with one or more fuel cells, so that the integrated endothermic reaction stage can use the heat from the fuel cells as a heat source for reforming. Such an integrated endothermic reaction stage can be defined as being positioned less than 5 times the height of a stack element from any fuel cells providing heat to the integrated stage. For example, an integrated endothermic reaction stage (such as a reforming stage) can be positioned less than 5 times the height of a stack element from any fuel cells that are heat integrated, such as less than 3 times the height of a stack element. In this discussion, an integrated reforming stage or integrated endothermic reaction stage that represents an adjacent stack element to a fuel cell element can be defined as being about one stack element height or less away from the adjacent fuel cell element.

In some aspects, a separate reforming stage that is heat integrated with a fuel cell element can also correspond to a reforming stage that is associated with the fuel cell element. In such aspects, an integrated fuel cell element can provide at least a portion of the heat to the associated reforming stage, and the associated reforming stage can provide at least a portion of the reforming stage output to the integrated fuel cell as a fuel stream. In other aspects, a separate reforming stage can be integrated with a fuel cell for heat transfer without being associated with the fuel cell. In this type of situation, the separate reforming stage can receive heat from the fuel cell, but the output of the reforming stage is not used as an input to the fuel cell. Instead, the output of such a reforming stage can be used for another purpose, such as directly adding the output to the anode exhaust stream, or for forming a separate output stream from the fuel cell assembly.

More generally, a separate stack element in a fuel cell stack can be used to perform any convenient type of endothermic reaction that can take advantage of the waste heat provided by integrated fuel cell stack elements. Instead of plates suitable for performing a reforming reaction on a hydrocarbon fuel stream, a separate stack element can have plates suitable for catalyzing another type of endothermic reaction. A manifold or other arrangement of inlet manifolds in the fuel cell stack can be used to provide an appropriate input flow to each stack element. A similar manifold or other arrangement of outlet manifolds can also be used to withdraw the output flows from each stack element. Optionally, the output flows from a endothermic reaction stage in a stack can be withdrawn from the fuel cell stack without having the output flow pass through a fuel cell anode. In such an optional aspect, the products of the exothermic reaction will therefore exit from the fuel cell stack without passing through a fuel cell anode. Examples of other types of endothermic reactions that can be performed in stack elements in a fuel cell stack include ethanol dehydration to form ethylene and ethane cracking.

Recycle: As defined herein, recycle of a portion of a fuel cell output (such as an anode exhaust or a stream separated or withdrawn from an anode exhaust) to a fuel cell inlet can correspond to a direct or indirect recycle stream. A direct recycle of a stream to a fuel cell inlet is defined as recycle of the stream without passing through an intermediate process, while an indirect recycle involves recycle after passing a stream through one or more intermediate processes. For example, if the anode exhaust is passed through a $CO_2$ separation stage prior to recycle, this is considered an indirect recycle of the anode exhaust. If a portion of the anode exhaust, such as an $H_2$ stream withdrawn from the anode exhaust, is passed into a gasifier for converting coal into a fuel suitable for introduction into the fuel cell, then that is also considered an indirect recycle.

Anode Inputs and Outputs

In various aspects of the invention, the MCFC array can be fed by a fuel received at the anode inlet that comprises, for example, both hydrogen and a hydrocarbon such as methane (or alternatively a hydrocarbonaceous or hydrocarbon-like compound that may contain heteroatoms different from C and H). Most of the methane (or other hydrocarbonaceous or hydrocarbon-like compound) fed to the anode can typically be fresh methane. In this description, a fresh fuel such as fresh methane refers to a fuel that is not recycled from another fuel cell process. For example, methane recycled from the anode outlet stream back to the anode inlet may not be considered "fresh" methane, and can instead be described as reclaimed methane. The fuel source used can be shared with other components, such as a turbine that uses a portion of the fuel source to provide a $CO_2$-containing stream for the cathode input. The fuel source input can include water in a proportion to the fuel appropriate for reforming the hydrocarbon (or hydrocarbon-like) compound in the reforming section that generates hydrogen. For example, if methane is the fuel input for reforming to generate $H_2$, the molar ratio of water to fuel can be from about one to one to about ten to one, such as at least about two to one. A ratio of four to one or greater is typical for external reforming, but lower values can be typical for internal reforming. To the degree that $H_2$ is a portion of the fuel source, in some optional aspects no additional water may be needed in the fuel, as the oxidation of $H_2$ at the anode can tend to produce $H_2O$ that can be used for reforming the fuel. The fuel source can also optionally contain components incidental to the fuel source (e.g., a natural gas feed can contain some content of $CO_2$ as an additional component). For example, a natural gas feed can contain $CO_2$, $N_2$, and/or other inert (noble) gases as additional components. Optionally, in some aspects the fuel source may also contain CO, such as CO from a recycled portion of the anode exhaust. An additional or alternate potential source for CO in the fuel into a fuel cell assembly can be CO generated by steam reforming of a hydrocarbon fuel performed on the fuel prior to entering the fuel cell assembly.

More generally, a variety of types of fuel streams may be suitable for use as an input stream for the anode of a molten carbonate fuel cell. Some fuel streams can correspond to streams containing hydrocarbons and/or hydrocarbon-like compounds that may also include heteroatoms different from C and H. In this discussion, unless otherwise specified, a reference to a fuel stream containing hydrocarbons for an MCFC anode is defined to include fuel streams containing such hydrocarbon-like compounds. Examples of hydrocarbon (including hydrocarbon-like) fuel streams include natural gas, streams containing C1-C4 carbon compounds (such as methane or ethane), and streams containing heavier C5+ hydrocarbons (including hydrocarbon-like compounds), as well as combinations thereof. Still other additional or alternate examples of potential fuel streams for use in an anode input can include biogas-type streams, such as methane produced from natural (biological) decomposition of organic material.

In some aspects, a molten carbonate fuel cell can be used to process an input fuel stream, such as a natural gas and/or hydrocarbon stream, with a low energy content due to the presence of diluent compounds. For example, some sources of methane and/or natural gas are sources that can include substantial amounts of either $CO_2$ or other inert molecules, such as nitrogen, argon, or helium. Due to the presence of elevated amounts of $CO_2$ and/or inerts, the energy content of a fuel stream based on the source can be reduced. Using a low energy content fuel for a combustion reaction (such as for powering a combustion-powered turbine) can pose difficulties. However, a molten carbonate fuel cell can generate power based on a low energy content fuel source with a reduced or minimal impact on the efficiency of the fuel cell. The presence of additional gas volume can require additional heat for raising the temperature of the fuel to the temperature for reforming and/or the anode reaction. Additionally, due to the equilibrium nature of the water gas shift reaction within a fuel cell anode, the presence of additional $CO_2$ can have an impact on the relative amounts of $H_2$ and CO present in the anode output. However, the inert compounds otherwise can have only a minimal direct impact on the reforming and anode reactions. The amount of $CO_2$ and/or inert compounds in a fuel stream for a molten carbonate fuel cell, when present, can be at least about 1 vol %, such as at least about 2 vol %, or at least about 5 vol %, or at least about 10 vol %, or at least about 15 vol %, or at least about 20 vol %, or at least about 25 vol %, or at least about 30 vol %, or at least about 35 vol %, or at least about 40 vol %, or at least about 45 vol %, or at least about 50 vol %, or at least about 75 vol %. Additionally or alternately, the amount of $CO_2$ and/or inert compounds in a fuel stream for a molten carbonate fuel cell can be about 90 vol % or less, such as about 75 vol % or less, or about 60 vol % or less, or about 50 vol % or less, or about 40 vol % or less, or about 35 vol % or less. Additional details related to use of molten carbonate fuel cells with input gases have increased content of $CO_2$ and/or inert compounds can be found, for example, in U.S. application Ser. No. 14/207,686, the relevant contents of which are incorporated herein by reference.

Yet other examples of potential sources for an anode input stream can correspond to refinery and/or other industrial process output streams. For example, coking is a common process in many refineries for converting heavier compounds to lower boiling ranges. Coking typically produces an off-gas containing a variety of compounds that are gases at room temperature, including CO and various $C_1$-$C_4$ hydrocarbons. This off-gas can be used as at least a portion of an anode input stream. Other refinery off-gas streams can additionally or alternately be suitable for inclusion in an anode input stream, such as light ends (C1-C4) generated during cracking or other refinery processes. Still other suitable refinery streams can additionally or alternately include refinery streams containing CO or $CO_2$ that also contain $H_2$ and/or reformable fuel compounds. Additional details related to integration of molten carbonate fuel cells with other refinery streams can be found, for example, in U.S. application Ser. No. 14/207,710, the relevant contents of which are incorporated herein by reference.

Still other potential sources for an anode input can additionally or alternatively include streams with increased water content. For example, an ethanol output stream from an ethanol plant (or another type of fermentation process) can include a substantial portion of $H_2O$ prior to final distillation. Such $H_2O$ can typically cause only minimal impact on the operation of a fuel cell. Thus, a fermentation mixture of alcohol (or other fermentation product) and water can be used as at least a portion of an anode input stream. Additional details related to integration of molten carbonate fuel cells with processes for formation of compounds via fermentation can be found, for example, in U.S. application Ser. No. 14/207,721, the relevant contents of which are incorporated herein by reference.

Biogas, or digester gas, is another additional or alternate potential source for an anode input. Biogas may primarily comprise methane and $CO_2$ and is typically produced by the breakdown or digestion of organic matter. Anaerobic bacteria may be used to digest the organic matter and produce the biogas. Impurities, such as sulfur-containing compounds, may be removed from the biogas prior to use as an anode input.

The output stream from an MCFC anode can include $H_2O$, $CO_2$, CO, and $H_2$. Optionally, the anode output stream could also have unreacted fuel (such as $H_2$ or $CH_4$) or inert compounds in the feed as additional output components. Instead of using this output stream as a fuel source to provide heat for a reforming reaction or as a combustion fuel for heating the cell, one or more separations can be performed on the anode output stream to separate the $CO_2$ from the components with potential value as inputs to another process, such as $H_2$ or CO. The $H_2$ and/or CO can be used as a syngas for chemical synthesis, as a source of hydrogen for chemical reaction, and/or as a fuel with reduced greenhouse gas emissions. Additional details related to integration of molten carbonate fuel cells with processes that can use syngas, such as processes for steel production, can be found, for example, in U.S. application Ser. No. 14/207,726, the relevant contents of which are incorporated herein by reference. Furthermore, additional details related to integration of the anode output of molten carbonate fuel cells with other refinery processes can be found, for example, in U.S. application Ser. No. 14/207,710, the relevant contents of which are incorporated herein by reference.

In various aspects, the composition of the output stream from the anode can be impacted by several factors. Factors that can influence the anode output composition can include the composition of the input stream to the anode, the amount of current generated by the fuel cell, and/or the temperature at the exit of the anode. The temperature of at the anode exit can be relevant due to the equilibrium nature of the water gas shift reaction. In a typical anode, at least one of the plates forming the wall of the anode can be suitable for catalyzing the water gas shift reaction. As a result, if a) the composition of the anode input stream is known, b) the extent of reforming of reformable fuel in the anode input stream is known, and c) the amount of carbonate transported from the cathode to anode (corresponding to the amount of electrical current generated) is known, the composition of the anode output can be determined based on the equilibrium constant for the water gas shift reaction.

$$K_{eq}=\{[CO_2]*[H_2]\}/\{[CO]*[H_2O]\}$$

In the above equation, $K_{eq}$ is the equilibrium constant for the reaction at a given temperature and pressure, and [X] is the partial pressure of component X. Based on the water gas shift reaction, it can be noted that an increased $CO_2$ concentration in the anode input can tend to result in additional CO formation (at the expense of $H_2$) while an increased $H_2O$ concentration can tend to result in additional $H_2$ formation (at the expense of CO).

To determine the composition at the anode output, the composition of the anode input can be used as a starting point. This composition can then be modified to reflect the extent of reforming of any reformable fuels that can occur within the anode. Such reforming can reduce the hydrocarbon content of the anode input in exchange for increased hydrogen and $CO_2$. Next, based on the amount of electrical current generated, the amount of $H_2$ in the anode input can be reduced in exchange for additional $H_2O$ and $CO_2$. This composition can then be adjusted based on the equilibrium constant for the water gas shift reaction to determine the exit concentrations for $H_2$, CO, $CO_2$, and $H_2O$.

Table 1 shows the anode exhaust composition at different fuel utilizations for a typical type of fuel. The anode exhaust composition can reflect the combined result of the anode reforming reaction, water gas shift reaction, and the anode oxidation reaction. The output composition values in Table 1 were calculated by assuming an anode input composition with an about 2 to 1 ratio of steam ($H_2O$) to carbon (reformable fuel). The reformable fuel was assumed to be methane, which was assumed to be 100% reformed to hydrogen. The initial $CO_2$ and $H_2$ concentrations in the anode input were assumed to be negligible, while the input $N_2$ concentration was about 0.5%. The fuel utilization $U_f$ (as defined herein) was allowed to vary from about 35% to about 70% as shown in the table. The exit temperature for the fuel cell anode was assumed to be about 650° C. for purposes of determining the correct value for the equilibrium constant.

TABLE 1

| | | \multicolumn{8}{c}{Anode Exhaust Composition} |
|---|---|---|---|---|---|---|---|---|---|
| Uf | % | 35% | 40% | 45% | 50% | 55% | 60% | 65% | 70% |
| | | | | Anode Exhaust Composition | | | | | |
| $H_2O$ | %, wet | 32.5% | 34.1% | 35.5% | 36.7% | 37.8% | 38.9% | 39.8% | 40.5% |
| $CO_2$ | %, wet | 26.7% | 29.4% | 32.0% | 34.5% | 36.9% | 39.3% | 41.5% | 43.8% |
| $H_2$ | %, wet | 29.4% | 26.0% | 22.9% | 20.0% | 17.3% | 14.8% | 12.5% | 10.4% |
| CO | %, wet | 10.8% | 10.0% | 9.2% | 8.4% | 7.5% | 6.7% | 5.8% | 4.9% |
| $N_2$ | %, wet | 0.5% | 0.5% | 0.5% | 0.4% | 0.4% | 0.4% | 0.4% | 0.4% |
| $CO_2$ | %, dry | 39.6% | 44.6% | 49.6% | 54.5% | 59.4% | 64.2% | 69.0% | 73.7% |
| $H_2$ | %, dry | 43.6% | 39.4% | 35.4% | 31.5% | 27.8% | 24.2% | 20.7% | 17.5% |
| CO | %, dry | 16.1% | 15.2% | 14.3% | 13.2% | 12.1% | 10.9% | 9.7% | 8.2% |
| $N_2$ | %, dry | 0.7% | 0.7% | 0.7% | 0.7% | 0.7% | 0.7% | 0.7% | 0.7% |
| $H_2$/CO | | 2.7 | 2.6 | 2.5 | 2.4 | 2.3 | 2.2 | 2.1 | 2.1 |
| ($H_2 - CO_2$)/ ($CO + CO_2$) | | 0.07 | −0.09 | −0.22 | −0.34 | −0.44 | −0.53 | −0.61 | −0.69 |

Table 1 shows anode output compositions for a particular set of conditions and anode input composition. More generally, in various aspects the anode output can include about 10 vol % to about 50 vol % $H_2O$. The amount of $H_2O$ can vary greatly, as $H_2O$ in the anode can be produced by the anode oxidation reaction. If an excess of $H_2O$ beyond what is needed for reforming is introduced into the anode, the excess $H_2O$ can typically pass through largely unreacted, with the exception of $H_2O$ consumed (or generated) due to fuel reforming and the water gas shift reaction. The $CO_2$ concentration in the anode output can also vary widely, such as from about 20 vol % to about 50 vol % $CO_2$. The amount of $CO_2$ can be influenced by both the amount of electrical current generated as well as the amount of $CO_2$ in the anode input flow. The amount of $H_2$ in the anode output can additionally or alternately be from about 10 vol % $H_2$ to about 50 vol % $H_2$, depending on the fuel utilization in the anode. At the anode output, the amount of CO can be from about 5 vol % to about 20 vol %. It is noted that the amount of CO relative to the amount of $H_2$ in the anode output for a given fuel cell can be determined in part by the equilibrium constant for the water gas shift reaction at the temperature and pressure present in the fuel cell. The anode output can further additionally or alternately include 5 vol % or less of various other components, such as $N_2$, $CH_4$ (or other unreacted carbon-containing fuels), and/or other components.

Optionally, one or more water gas shift reaction stages can be included after the anode output to convert CO and $H_2O$ in the anode output into $CO_2$ and $H_2$, if desired. The amount of $H_2$ present in the anode output can be increased, for example, by using a water gas shift reactor at lower temperature to convert $H_2O$ and CO present in the anode output into $H_2$ and $CO_2$. Alternatively, the temperature can be raised and the water-gas shift reaction can be reversed, producing more CO and $H_2O$ from $H_2$ and $CO_2$. Water is an expected output of the reaction occurring at the anode, so the anode output can typically have an excess of $H_2O$ relative to the amount of CO present in the anode output. Alternatively, $H_2O$ can be added to the stream after the anode exit but before the water gas shift reaction. CO can be present in the anode output due to incomplete carbon conversion during reforming and/or due to the equilibrium balancing reactions between $H_2O$, CO, $H_2$, and $CO_2$ (i.e., the water-gas shift equilibrium) under either reforming conditions or the conditions present during the anode reaction. A water gas shift reactor can be operated under conditions to drive the equilibrium further in the direction of forming $CO_2$ and $H_2$ at the expense of CO and $H_2O$. Higher temperatures can tend to favor the formation of CO and $H_2O$. Thus, one option for operating the water gas shift reactor can be to expose the anode output stream to a suitable catalyst, such as a catalyst including iron oxide, zinc oxide, copper on zinc oxide, or the like, at a suitable temperature, e.g., between about 190° C. to about 210° C. Optionally, the water-gas shift reactor can include two stages for reducing the CO concentration in an anode output stream, with a first higher temperature stage operated at a temperature from at least about 300° C. to about 375° C. and a second lower temperature stage operated at a temperature of about 225° C. or less, such as from about 122° C. to about 210° C. In addition to increasing the amount of $H_2$ present in the anode output, the water-gas shift reaction can additionally or alternately increase the amount of $CO_2$ at the expense of CO. This can exchange difficult-to-remove carbon monoxide (CO) for carbon dioxide, which can be more readily removed by condensation (e.g., cryogenic removal), chemical reaction (such as amine removal), and/or other $CO_2$ removal methods. Additionally or alternately, it may be desirable to increase the CO content present in the anode exhaust in order to achieve a desired ratio of $H_2$ to CO.

After passing through the optional water gas shift reaction stage, the anode output can be passed through one or more separation stages for removal of water and/or $CO_2$ from the anode output stream. For example, one or more $CO_2$ output streams can be formed by performing $CO_2$ separation on the anode output using one or more methods individually or in combination. Such methods can be used to generate $CO_2$ output stream(s) having a $CO_2$ content of 90 vol % or greater, such as at least 95% vol % $CO_2$, or at least 98 vol % $CO_2$. Such methods can recover about at least about 70% of the $CO_2$ content of the anode output, such as at least about 80% of the $CO_2$ content of the anode output, or at least about 90%. Alternatively, in some aspects it may be desirable to recover only a portion of the $CO_2$ within an anode output stream, with the recovered portion of $CO_2$ being about 33% to about 90% of the $CO_2$ in the anode output, such as at least about 40%, or at least about 50%. For example, it may be desirable to retain some $CO_2$ in the anode output flow so that a desired composition can be achieved in a subsequent water gas shift stage. Suitable separation methods may comprise use of a physical solvent (e.g., Selexol™ or Rectisol™); amines or other bases (e.g., MEA or MDEA); refrigeration (e.g., cryogenic separation); pressure swing adsorption; vacuum swing adsorption; and combinations thereof. A cryogenic $CO_2$ separator can be an example of a suitable separator. As the anode output is cooled, the majority of the water in the anode output can be separated out as a condensed (liquid) phase. Further cooling and/or pressurizing of the water-depleted anode output flow can then separate high purity $CO_2$, as the other remaining components in the anode output flow (such as $H_2$, $N_2$, $CH_4$) do not tend to readily form condensed phases. A cryogenic $CO_2$ separator can recover between about 33% and about 90% of the $CO_2$ present in a flow, depending on the operating conditions.

Removal of water from the anode exhaust to form one or more water output streams can also be beneficial, whether prior to, during, or after performing $CO_2$ separation. The amount of water in the anode output can vary depending on operating conditions selected. For example, the steam-to-carbon ratio established at the anode inlet can affect the water content in the anode exhaust, with high steam-to-carbon ratios typically resulting in a large amount of water that can pass through the anode unreacted and/or reacted only due to the water gas shift equilibrium in the anode. Depending on the aspect, the water content in the anode exhaust can correspond to up to about 30% or more of the volume in the anode exhaust. Additionally or alternately, the water content can be about 80% or less of the volume of the anode exhaust. While such water can be removed by compression and/or cooling with resulting condensation, the removal of this water can require extra compressor power and/or heat exchange surface area and excessive cooling water. One beneficial way to remove a portion of this excess water can be based on use of an adsorbent bed that can capture the humidity from the moist anode effluent and can then be 'regenerated' using dry anode feed gas, in order to provide additional water for the anode feed. HVAC-style (heating, ventilation, and air conditioning) adsorption wheels design can be applicable, because anode exhaust and inlet can be similar in pressure, and minor leakage from one stream to the other can have minimal impact on the overall process. In embodiments where $CO_2$ removal is performed using a cryogenic process, removal of water prior to or during $CO_2$ removal may be desirable, including removal by triethyleneglycol (TEG) system and/or desiccants. By contrast, if an amine wash is used for $CO_2$ removal, water can be removed from the anode exhaust downstream from the $CO_2$ removal stage.

Alternately or in addition to a $CO_2$ output stream and/or a water output stream, the anode output can be used to form one or more product streams containing a desired chemical or fuel product. Such a product stream or streams can correspond to a syngas stream, a hydrogen stream, or both syngas product and hydrogen product streams. For example, a hydrogen product stream containing at least about 70 vol % $H_2$, such as at least about 90 vol % $H_2$ or at least about 95 vol % $H_2$, can be formed. Additionally or alternately, a syngas stream containing at least about 70 vol % of $H_2$ and CO combined, such as at least about 90 vol % of $H_2$ and CO can be formed. The one or more product streams can have a gas volume corresponding to at least about 75% of the combined $H_2$ and CO gas volumes in the anode output, such as at least about 85% or at least about 90% of the combined $H_2$ and CO gas volumes. It is noted that the relative amounts of $H_2$ and CO in the products streams may differ from the $H_2$ to CO ratio in the anode output based on use of water gas shift reaction stages to convert between the products.

In some aspects, it can be desirable to remove or separate a portion of the $H_2$ present in the anode output. For example, in some aspects the $H_2$ to CO ratio in the anode exhaust can be at least about 3.0:1. By contrast, processes that make use of syngas, such as Fischer-Tropsch synthesis, may consume $H_2$ and CO in a different ratio, such as a ratio that is closer to 2:1. One alternative can be to use a water gas shift reaction to modify the content of the anode output to have an $H_2$ to CO ratio closer to a desired syngas composition. Another alternative can be to use a membrane separation to remove a portion of the $H_2$ present in the anode output to achieve a desired ratio of $H_2$ and CO, or still alternately to use a combination of membrane separation and water gas shift reactions. One advantage of using a membrane separation to remove only a portion of the $H_2$ in the anode output can be that the desired separation can be performed under relatively mild conditions. Since one goal can be to produce a retentate that still has a substantial $H_2$ content, a permeate of high purity hydrogen can be generated by membrane separation without requiring severe conditions. For example, rather than having a pressure on the permeate side of the membrane of about 100 kPaa or less (such as ambient pressure), the permeate side can be at an elevated pressure relative to ambient while still having sufficient driving force to perform the membrane separation. Additionally or alternately, a sweep gas such as methane can be used to provide a driving force for the membrane separation. This can reduce the purity of the $H_2$ permeate stream, but may be advantageous, depending on the desired use for the permeate stream. Additional details related to integration of molten carbonate fuel cells with Fischer-Tropsch processes can be found, for example, in U.S. application Ser. No. 14/207,705, the relevant contents of which are incorporated herein by reference.

In various aspects of the invention, at least a portion of the anode exhaust stream (preferably after separation of $CO_2$ and/or $H_2O$) can be used as a feed for a process external to the fuel cell and associated reforming stages. In various aspects, the anode exhaust can have a ratio of $H_2$ to CO of about 1.5:1 to about 10:1, such as at least about 3.0:1, or at least about 4.0:1, or at least about 5.0:1. A syngas stream can be generated or withdrawn from the anode exhaust. The anode exhaust gas, optionally after separation of $CO_2$ and/or $H_2O$, and optionally after performing a water gas shift reaction and/or a membrane separation to remove excess hydrogen, can correspond to a stream containing substantial portions of $H_2$ and/or CO. For a stream with a relatively low content of CO, such as a stream where the ratio of $H_2$ to CO is at least about 3:1, the anode exhaust can be suitable for use as an $H_2$ feed. Examples of processes that could benefit from an $H_2$ feed can include, but are not limited to, refinery processes, an ammonia synthesis plant, or a turbine in a (different) power generation system, or combinations thereof. Depending on the application, still lower $CO_2$ contents can be desirable. For a stream with an $H_2$-to-CO ratio of less than about 2.2 to 1 and greater than about 1.9 to 1, the stream can be suitable for use as a syngas feed. Examples of processes that could benefit from a syngas feed can include, but are not limited to, a gas-to-liquids plant (such as a plant using a Fischer-Tropsch process with a non-shifting catalyst) and/or a methanol synthesis plant. The amount of the anode exhaust used as a feed for an external process can be any convenient amount. Optionally, when a portion of the anode exhaust is used as a feed for an external process, a second portion of the anode exhaust can be recycled to the anode input and/or recycled to the combustion zone for a combustion-powered generator. Additional details related to integration of molten carbonate fuel cells with methanol synthesis processes can be found, for example, in U.S. application Ser. No. 14/207,714, the relevant contents of which are incorporated herein by reference.

The input streams useful for different types of Fischer-Tropsch synthesis processes can provide an example of the different types of product streams that may be desirable to generate from the anode output. For a Fischer-Tropsch synthesis reaction system that uses a shifting catalyst, such as an iron-based catalyst, the desired input stream to the reaction system can include $CO_2$ in addition to $H_2$ and CO. If a sufficient amount of $CO_2$ is not present in the input stream, a Fischer-Tropsch catalyst with water gas shift activity can consume CO in order to generate additional $CO_2$, resulting in a syngas that can be deficient in CO. For integration of such a Fischer-Tropsch process with an MCFC fuel cell, the separation stages for the anode output can be operated to retain a desired amount of $CO_2$ (and optionally $H_2O$) in the syngas product. By contrast, for a Fischer-Tropsch catalyst based on a non-shifting catalyst, any $CO_2$ present in a product stream could serve as an inert component in the Fischer-Tropsch reaction system. Additional details related to integration of molten carbonate fuel cells with Fischer-Tropsch processes can be found, for example, in U.S. application Ser. Nos. 14/207,708 and/or 14/207,711, the relevant contents of which are incorporated herein by reference.

In an aspect where the membrane is swept with a sweep gas such as a methane sweep gas, the methane sweep gas can correspond to a methane stream used as the anode fuel or in a different low pressure process, such as a boiler, furnace, gas turbine, or other fuel-consuming device. In such an aspect, low levels of $CO_2$ permeation across the membrane can have minimal consequence. Such $CO_2$ that may permeate across the membrane can have a minimal impact on the reactions within the anode, and such $CO_2$ can remain contained in the anode product. Therefore, the $CO_2$ (if any) lost across the membrane due to permeation does not need to be transferred again across the MCFC electrolyte. This can significantly reduce the separation selectivity requirement for the hydrogen permeation membrane. This can allow, for example, use of a higher-permeability membrane having a lower selectivity, which can enable use of a lower pressure and/or reduced membrane surface area. In such an aspect of the invention, the volume of the sweep gas can be a large multiple of the volume of hydrogen in the anode exhaust, which can allow the effective hydrogen concentration on the permeate side to be maintained close to zero. The hydrogen thus separated can be incorporated into the turbine-fed methane where it can enhance the turbine combustion characteristics, as described above.

It is noted that excess $H_2$ produced in the anode can represent a fuel where the greenhouse gases have already been separated. Any $CO_2$ in the anode output can be readily separated from the anode output, such as by using an amine wash, a cryogenic $CO_2$ separator, and/or a pressure or vacuum swing absorption process. Several of the components of the anode output ($H_2$, CO, $CH_4$) are not easily removed, while $CO_2$ and $H_2O$ can usually be readily removed. Depending on the embodiment, at least about 90 vol % of the $CO_2$ in the anode output can be separated out to form a relatively high purity $CO_2$ output stream. Thus, any $CO_2$ generated in the anode can be efficiently separated out to form a high purity $CO_2$ output stream. After separation, the remaining portion of the anode output can correspond primarily to components with chemical and/or fuel value, as well as reduced amounts of $CO_2$ and/or $H_2O$. Since a substantial portion of the $CO_2$ generated by the original fuel (prior to reforming) can have been separated out, the amount of $CO_2$ generated by subsequent burning of the remaining portion of the anode output can be reduced. In particular, to the degree that the fuel in the remaining portion of the anode output is $H_2$, no additional greenhouse gases can typically be formed by burning of this fuel. Additional details related to use of hydrogen generated by molten carbonate fuel cells for operating a hydrogen turbine can be found, for example, in U.S. application Ser. No. 14/207,700, the relevant contents of which are incorporated herein by reference.

The anode exhaust can be subjected to a variety of gas processing options, including water-gas shift and separation of the components from each other.

Cathode Inputs and Outputs

Conventionally, a molten carbonate fuel cell can be operated based on drawing a desired load while consuming some portion of the fuel in the fuel stream delivered to the anode. The voltage of the fuel cell can then be determined by the load, fuel input to the anode, air and $CO_2$ provided to the cathode, and the internal resistances of the fuel cell. The $CO_2$ to the cathode can be conventionally provided in part by using the anode exhaust as at least a part of the cathode input stream. By contrast, the present invention can use separate/different sources for the anode input and cathode input. By removing any direct link between the composition of the anode input flow and the cathode input flow, additional options become available for operating the fuel cell, such as to generate excess synthesis gas, to improve capture of carbon dioxide, and/or to improve the total efficiency (electrical plus chemical power) of the fuel cell, among others.

In a molten carbonate fuel cell, the transport of carbonate ions across the electrolyte in the fuel cell can provide a method for transporting $CO_2$ from a first flow path to a second flow path, where the transport method can allow transport from a lower concentration (the cathode) to a higher concentration (the anode), which can thus facilitate capture of $CO_2$. Part of the selectivity of the fuel cell for $CO_2$ separation can be based on the electrochemical reactions allowing the cell to generate electrical power. For nonreactive species (such as $N_2$) that effectively do not participate in the electrochemical reactions within the fuel cell, there can be an insignificant amount of reaction and transport from cathode to anode. By contrast, the potential (voltage) difference between the cathode and anode can provide a strong driving force for transport of carbonate ions across the fuel cell. As a result, the transport of carbonate ions in the molten carbonate fuel cell can allow $CO_2$ to be transported from the cathode (lower $CO_2$ concentration) to the anode (higher $CO_2$ concentration) with relatively high selectivity. However, a challenge in using molten carbonate fuel cells for carbon dioxide removal can be that the fuel cells have limited ability to remove carbon dioxide from relatively dilute cathode feeds. The voltage and/or power generated by a carbonate fuel cell can start to drop rapidly as the $CO_2$ concentration falls below about 2.0 vol %. As the $CO_2$ concentration drops further, e.g., to below about 1.0 vol %, at some point the voltage across the fuel cell can become low enough that little or no further transport of carbonate may occur and the fuel cell ceases to function. Thus, at least some $CO_2$ is likely to be present in the exhaust gas from the cathode stage of a fuel cell under commercially viable operating conditions.

The amount of carbon dioxide delivered to the fuel cell cathode(s) can be determined based on the $CO_2$ content of a source for the cathode inlet. One example of a suitable $CO_2$-containing stream for use as a cathode input flow can be an output or exhaust flow from a combustion source. Examples of combustion sources include, but are not limited to, sources based on combustion of natural gas, combustion of coal, and/or combustion of other hydrocarbon-type fuels (including biologically derived fuels). Additional or alternate sources can include other types of boilers, fired heaters, furnaces, and/or other types of devices that burn carbon-containing fuels in order to heat another substance (such as water or air). To a first approximation, the $CO_2$ content of the output flow from a combustion source can be a minor portion of the flow. Even for a higher $CO_2$ content exhaust flow, such as the output from a coal-fired combustion source, the $CO_2$ content from most commercial coal-fired power plants can be about 15 vol % or less. More generally, the $CO_2$ content of an output or exhaust flow from a combustion source can be at least about 1.5 vol %, or at least about 1.6 vol %, or at least about 1.7 vol %, or at least about 1.8 vol %, or at least about 1.9 vol %, or at least greater 2 vol %, or at least about 4 vol %, or at least about 5 vol %, or at least about 6 vol %, or at least about 8 vol %. Additionally or alternately, the $CO_2$ content of an output or exhaust flow from a combustion source can be about 20 vol % or less, such as about 15 vol % or less, or about 12 vol % or less, or about 10 vol % or less, or about 9 vol % or less, or about 8 vol % or less, or about 7 vol % or less, or about 6.5 vol % or less, or about 6 vol % or less, or about 5.5 vol % or less, or about 5 vol % or less, or about 4.5 vol % or less. The concentrations given above are on a dry basis. It is noted that the lower $CO_2$ content values can be present in the exhaust from some natural gas or methane combustion sources, such as generators that are part of a power generation system that may or may not include an exhaust gas recycle loop.

Other potential sources for a cathode input stream can additionally or alternately include sources of bio-produced $CO_2$. This can include, for example, $CO_2$ generated during processing of bio-derived compounds, such as $CO_2$ generated during ethanol production. An additional or alternate example can include $CO_2$ generated by combustion of a bio-produced fuel, such as combustion of lignocellulose. Still other additional or alternate potential $CO_2$ sources can correspond to output or exhaust streams from various industrial processes, such as $CO_2$-containing streams generated by plants for manufacture of steel, cement, and/or paper.

Yet another additional or alternate potential source of $CO_2$ can be $CO_2$-containing streams from a fuel cell. The $CO_2$-containing stream from a fuel cell can correspond to a cathode output stream from a different fuel cell, an anode output stream from a different fuel cell, a recycle stream from the cathode output to the cathode input of a fuel cell, and/or a recycle stream from an anode output to a cathode input of a fuel cell. For example, an MCFC operated in standalone mode under conventional conditions can generate a cathode exhaust with a $CO_2$ concentration of at least about 5 vol %. Such a $CO_2$-containing cathode exhaust could be used as a cathode input for an MCFC operated according to an aspect of the invention. More generally, other types of fuel cells that generate a $CO_2$ output from the cathode exhaust can additionally or alternatively be used, as well as other types of $CO_2$-containing streams not generated by a "combustion" reaction and/or by a combustion-powered generator. Optionally but preferably, a $CO_2$-containing stream from another fuel cell can be from another molten carbonate fuel cell. For example, for molten carbonate fuel cells connected in series with respect to the cathodes, the output from the cathode for a first molten carbonate fuel cell can be used as the input to the cathode for a second molten carbonate fuel cell.

For various types of $CO_2$-containing streams from sources other than combustion sources, the $CO_2$ content of the stream can vary widely. The $CO_2$ content of an input stream to a cathode can contain at least about 2 vol % of $CO_2$, such as at least about 4 vol %, or at least about 5 vol %, or at least about 6 vol %, or at least about 8 vol %. Additionally or alternately, the $CO_2$ content of an input stream to a cathode can be about 30 vol % or less, such as about 25 vol % or less, or about 20 vol % or less, or about 15 vol % or less, or about 10 vol % or less, or about 8 vol % or less, or about 6 vol % or less, or about 4 vol % or less. For some still higher $CO_2$ content streams, the $CO_2$ content can be greater than about 30 vol %, such as a stream substantially composed of $CO_2$ with only incidental amounts of other compounds. As an example, a gas-fired turbine without exhaust gas recycle can produce an exhaust stream with a $CO_2$ content of approximately 4.2 vol %. With EGR, a gas-fired turbine can produce an exhaust stream with a $CO_2$ content of about 6-8 vol %. Stoichiometric combustion of methane can produce an exhaust stream with a $CO_2$ content of about 11 vol %. Combustion of coal can produce an exhaust stream with a $CO_2$ content of about 15-20 vol %. Fired heaters using refinery off-gas can produce an exhaust stream with a $CO_2$ content of about 12-15 vol %. A gas turbine operated on a low BTU gas without any EGR can produce an exhaust stream with a $CO_2$ content of ~12 vol %.

In addition to $CO_2$, a cathode input stream must include $O_2$ to provide the components necessary for the cathode reaction. Some cathode input streams can be based on having air as a component. For example, a combustion exhaust stream can be formed by combusting a hydrocarbon fuel in the presence of air. Such a combustion exhaust stream, or another type of cathode input stream having an oxygen content based on inclusion of air, can have an oxygen content of about 20 vol % or less, such as about 15 vol % or less, or about 10 vol % or less. Additionally or alternately, the oxygen content of the cathode input stream can be at least about 4 vol %, such as at least about 6 vol %, or at least about 8 vol %. More generally, a cathode input stream can have a suitable content of oxygen for performing the cathode reaction. In some aspects, this can correspond to an oxygen content of about 5 vol % to about 15 vol %, such as from about 7 vol % to about 9 vol %. For many types of cathode input streams, the combined amount of $CO_2$ and $O_2$ can correspond to less than about 21 vol % of the input stream, such as less than about 15 vol % of the stream or less than about 10 vol % of the stream. An air stream containing oxygen can be combined with a $CO_2$ source that has low oxygen content. For example, the exhaust stream generated by burning coal may include a low oxygen content that can be mixed with air to form a cathode inlet stream.

In addition to $CO_2$ and $O_2$, a cathode input stream can also be composed of inert/non-reactive species such as $N_2$, $H_2O$, and other typical oxidant (air) components. For example, for a cathode input derived from an exhaust from a combustion reaction, if air is used as part of the oxidant source for the combustion reaction, the exhaust gas can include typical components of air such as $N_2$, $H_2O$, and other compounds in minor amounts that are present in air. Depending on the nature of the fuel source for the combustion reaction, additional species present after combustion based on the fuel source may include one or more of $H_2O$, oxides of nitrogen ($NO_x$) and/or sulfur ($SO_x$), and other compounds either present in the fuel and/or that are partial or complete combustion products of compounds present in the fuel, such as CO. These species may be present in amounts that do not poison the cathode catalyst surfaces though they may reduce the overall cathode activity. Such reductions in performance may be acceptable, or species that interact with the cathode catalyst may be reduced to acceptable levels by known pollutant removal technologies.

The amount of $O_2$ present in a cathode input stream (such as an input cathode stream based on a combustion exhaust) can advantageously be sufficient to provide the oxygen needed for the cathode reaction in the fuel cell. Thus, the volume percentage of $O_2$ can advantageously be at least 0.5 times the amount of $CO_2$ in the exhaust. Optionally, as necessary, additional air can be added to the cathode input to provide sufficient oxidant for the cathode reaction. When some form of air is used as the oxidant, the amount of $N_2$ in the cathode exhaust can be at least about 78 vol %, e.g., at least about 88 vol %, and/or about 95 vol % or less. In some aspects, the cathode input stream can additionally or alternately contain compounds that are generally viewed as contaminants, such as $H_2S$ or $NH_3$. In other aspects, the cathode input stream can be cleaned to reduce or minimize the content of such contaminants.

In addition to the reaction to form carbonate ions for transport across the electrolyte, the conditions in the cathode can also be suitable for conversion of nitrogen oxides into nitrate and/or nitrate ions. Hereinafter, only nitrate ions will be referred to for convenience. The resulting nitrate ions can also be transported across the electrolyte for reaction in the anode. $NO_x$ concentrations in a cathode input stream can typically be on the order of ppm, so this nitrate transport reaction can have a minimal impact on the amount of carbonate transported across the electrolyte. However, this method of $NO_x$ removal can be beneficial for cathode input streams based on combustion exhausts from gas turbines, as this can provide a mechanism for reducing $NO_x$ emissions. The conditions in the cathode can additionally or alternately be suitable for conversion of unburned hydrocarbons (in combination with $O_2$ in the cathode input stream) to typical combustion products, such as $CO_2$ and $H_2O$.

A suitable temperature for operation of an MCFC can be between about 450° C. and about 750° C., such as at least about 500° C., e.g., with an inlet temperature of about 550° C. and an outlet temperature of about 625° C. Prior to entering the cathode, heat can be added to or removed from the combustion exhaust, if desired, e.g., to provide heat for other processes, such as reforming the fuel input for the anode. For example, if the source for the cathode input stream is a combustion exhaust stream, the combustion exhaust stream may have a temperature greater than a desired temperature for the cathode inlet. In such an aspect, heat can be removed from the combustion exhaust prior to use as the cathode input stream. Alternatively, the combustion exhaust could be at very low temperature, for example after a wet gas scrubber on a coal-fired boiler, in which case the combustion exhaust can be below about 100° C.

Molten Carbonate Fuel Cell Operation

In some aspects, a fuel cell may be operated in a single pass or once-through mode. In single pass mode, reformed products in the anode exhaust are not returned to the anode inlet. Thus, recycling syngas, hydrogen, or some other product from the anode output directly to the anode inlet is not done in single pass operation. More generally, in single pass operation, reformed products in the anode exhaust are also not returned indirectly to the anode inlet, such as by using reformed products to process a fuel stream subsequently introduced into the anode inlet. Optionally, $CO_2$ from the anode outlet can be recycled to the cathode inlet during operation of an MCFC in single pass mode. More generally, in some alternative aspects, recycling from the anode outlet to the cathode inlet may occur for an MCFC operating in single pass mode. Heat from the anode exhaust or output may additionally or alternately be recycled in a single pass mode. For example, the anode output flow may pass through a heat exchanger that cools the anode output and warms another stream, such as an input stream for the anode and/or the cathode. Recycling heat from anode to the fuel cell is consistent with use in single pass or once-through operation. Optionally but not preferably, constituents of the anode output may be burned to provide heat to the fuel cell during single pass mode.

Figure 4:
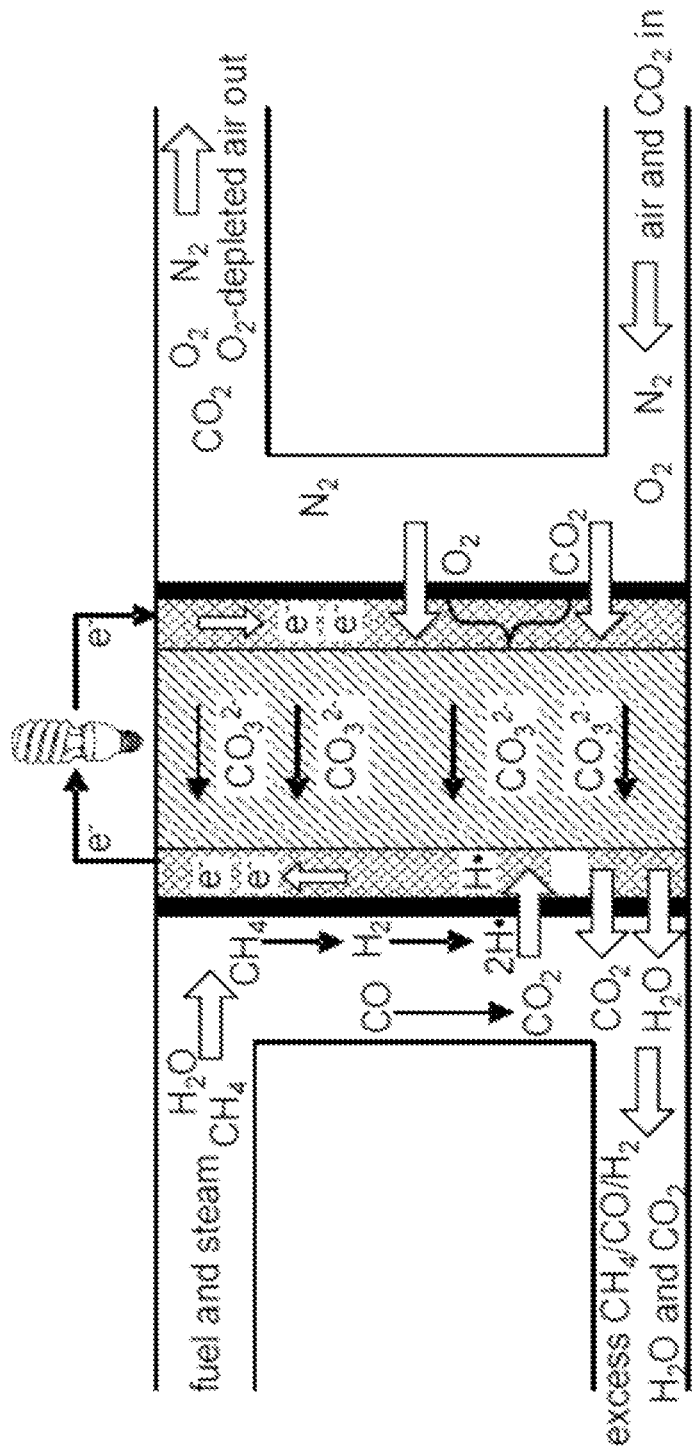
FIG. 4 schematically shows an example of the operation of a molten carbonate fuel cell.

FIG. 4 shows a schematic example of the operation of an MCFC for generation of electrical power. In FIG. 4, the anode portion of the fuel cell can receive fuel and steam ($H_2O$) as inputs, with outputs of water, $CO_2$, and optionally excess $H_2$, $CH_4$ (or other hydrocarbons), and/or CO. The cathode portion of the fuel cell can receive $CO_2$ and some oxidant (e.g., air/$O_2$) as inputs, with an output corresponding to a reduced amount of $CO_2$ in $O_2$-depleted oxidant (air). Within the fuel cell, $CO_3^{2-}$ ions formed in the cathode side can be transported across the electrolyte to provide the carbonate ions needed for the reactions occurring at the anode.

Several reactions can occur within a molten carbonate fuel cell such as the example fuel cell shown in FIG. 4. The reforming reactions can be optional, and can be reduced or eliminated if sufficient $H_2$ is provided directly to the anode. The following reactions are based on $CH_4$, but similar reactions can occur when other fuels are used in the fuel cell.

<anode reforming> $CH_4+H_2O => 3H_2+CO$ (1)

<water gas shift> $CO+H_2O => H_2+CO_2$ (2)

<reforming and water gas shift combined> $CH_4+2H_2O => 4H_2+CO_2$ (3)

<anode $H_2$ oxidation> $H_2+CO_3^{2-} => H_2O+CO_2+2e^-$ (4)

<cathode> $\frac{1}{2}O_2+CO_2+2e^- => CO_3^{2-}$ (5)

Reaction (1) represents the basic hydrocarbon reforming reaction to generate $H_2$ for use in the anode of the fuel cell. The CO formed in reaction (1) can be converted to $H_2$ by the water-gas shift reaction (2). The combination of reactions (1) and (2) is shown as reaction (3). Reactions (1) and (2) can occur external to the fuel cell, and/or the reforming can be performed internal to the anode.

Reactions (4) and (5), at the anode and cathode respectively, represent the reactions that can result in electrical power generation within the fuel cell. Reaction (4) combines $H_2$, either present in the feed or optionally generated by reactions (1) and/or (2), with carbonate ions to form $H_2O$, $CO_2$, and electrons to the circuit. Reaction (5) combines $O_2$, $CO_2$, and electrons from the circuit to form carbonate ions. The carbonate ions generated by reaction (5) can be transported across the electrolyte of the fuel cell to provide the carbonate ions needed for reaction (4). In combination with the transport of carbonate ions across the electrolyte, a closed current loop can then be formed by providing an electrical connection between the anode and cathode.

In various embodiments, a goal of operating the fuel cell can be to improve the total efficiency of the fuel cell and/or the total efficiency of the fuel cell plus an integrated chemical synthesis process. This is typically in contrast to conventional operation of a fuel cell, where the goal can be to operate the fuel cell with high electrical efficiency for using the fuel provided to the cell for generation of electrical power. As defined above, total fuel cell efficiency may be determined by dividing the electric output of the fuel cell plus the lower heating value of the fuel cell outputs by the lower heating value of the input components for the fuel cell. In other words, TFCE=(LHV(el)+LHV(sg out))/LHV(in), where LHV(in) and LHV(sg out) refer to the LHV of the fuel components (such as $H_2$, $CH_4$, and/or CO) delivered to the fuel cell and syngas ($H_2$, CO and/or $CO_2$) in the anode outlet streams or flows, respectively. This can provide a measure of the electric energy plus chemical energy generated by the fuel cell and/or the integrated chemical process. It is noted that under this definition of total efficiency, heat energy used within the fuel cell and/or used within the integrated fuel cell/chemical synthesis system can contribute to total efficiency. However, any excess heat exchanged or otherwise withdrawn from the fuel cell or integrated fuel cell/chemical synthesis system is excluded from the definition. Thus, if excess heat from the fuel cell is used, for example, to generate steam for electricity generation by a steam turbine, such excess heat is excluded from the definition of total efficiency.

Several operational parameters may be manipulated to operate a fuel cell with excess reformable fuel. Some parameters can be similar to those currently recommended for fuel cell operation. In some aspects, the cathode conditions and temperature inputs to the fuel cell can be similar to those recommended in the literature. For example, the desired electrical efficiency and the desired total fuel cell efficiency may be achieved at a range of fuel cell operating temperatures typical for molten carbonate fuel cells. In typical operation, the temperature can increase across the fuel cell.

In other aspects, the operational parameters of the fuel cell can deviate from typical conditions so that the fuel cell is operated to allow a temperature decrease from the anode inlet to the anode outlet and/or from the cathode inlet to the cathode outlet. For example, the reforming reaction to convert a hydrocarbon into $H_2$ and CO is an endothermic reaction. If a sufficient amount of reforming is performed in a fuel cell anode relative to the amount of oxidation of hydrogen to generate electrical current, the net heat balance in the fuel cell can be endothermic. This can cause a temperature drop between the inlets and outlets of a fuel cell. During endothermic operation, the temperature drop in the fuel cell can be controlled so that the electrolyte in the fuel cell remains in a molten state. Additional details related to operation of molten carbonate fuel cells with a temperature drop across the fuel cells can be found, for example, in U.S. application Ser. No. 14/207,704, the relevant contents of which are incorporated herein by reference.

Parameters that can be manipulated in a way so as to differ from those currently recommended can include the amount of fuel provided to the anode, the composition of the fuel provided to the anode, and/or the separation and capture of syngas in the anode output without significant recycling of syngas from the anode exhaust to either the anode input or the cathode input. In some aspects, no recycle of syngas or hydrogen from the anode exhaust to either the anode input or the cathode input can be allowed to occur, either directly or indirectly. In additional or alternative aspects, a limited amount of recycle can occur. In such aspects, the amount of recycle from the anode exhaust to the anode input and/or the cathode input can be less than about 10 vol % of the anode exhaust, such as less than about 5 vol %, or less than about 1 vol %.

Additionally or alternately, a goal of operating a fuel cell can be to separate $CO_2$ from the output stream of a combustion reaction or another process that produces a $CO_2$ output stream, in addition to allowing generation of electric power. In such aspects, the combustion reaction(s) can be used to power one or more generators or turbines, which can provide a majority of the power generated by the combined generator/fuel cell system. Rather than operating the fuel cell to optimize power generation by the fuel cell, the system can instead be operated to improve the capture of carbon dioxide from the combustion-powered generator while reducing or minimizing the number of fuels cells required for capturing the carbon dioxide. Selecting an appropriate configuration for the input and output flows of the fuel cell, as well as selecting appropriate operating conditions for the fuel cell, can allow for a desirable combination of total efficiency and carbon capture.

In some embodiments, the fuel cells in a fuel cell array can be arranged so that only a single stage of fuel cells (such as fuel cell stacks) can be present. In this type of embodiment, the anode fuel utilization for the single stage can represent the anode fuel utilization for the array. Another option can be that a fuel cell array can contain multiple stages of anodes and multiple stages of cathodes, with each anode stage having a fuel utilization within the same range, such as each anode stage having a fuel utilization within 10% of a specified value, for example within 5% of a specified value. Still another option can be that each anode stage can have a fuel utilization equal to a specified value or lower than the specified value by less than an amount, such as having each anode stage be not greater than a specified value by 10% or less, for example, by 5% or less. As an illustrative example, a fuel cell array with a plurality of anode stages can have each anode stage be within about 10% of 50% fuel utilization, which would correspond to each anode stage having a fuel utilization between about 40% and about 60%. As another example, a fuel cell array with a plurality of stages can have each anode stage be not greater than 60% anode fuel utilization with the maximum deviation being about 5% less, which would correspond to each anode stage having a fuel utilization between about 55% to about 60%. In still another example, one or more stages of fuel cells in a fuel cell array can be operated at a fuel utilization from about 30% to about 50%, such as operating a plurality of fuel cell stages in the array at a fuel utilization from about 30% to about 50%. More generally, any of the above types of ranges can be paired with any of the anode fuel utilization values specified herein.

Still another additional or alternate option can include specifying a fuel utilization for less than all of the anode stages. For example, in some aspects of the invention fuel cells/stacks can be arranged at least partially in one or more series arrangements such that anode fuel utilization can be specified for the first anode stage in a series, the second anode stage in a series, the final anode stage in a series, or any other convenient anode stage in a series. As used herein, the "first" stage in a series corresponds to the stage (or set of stages, if the arrangement contains parallel stages as well) to which input is directly fed from the fuel source(s), with later ("second," "third," "final," etc.) stages representing the stages to which the output from one or more previous stages is fed, instead of directly from the respective fuel source(s). In situations where both output from previous stages and input directly from the fuel source(s) are co-fed into a stage, there can be a "first" (set of) stage(s) and a "last" (set of) stage(s), but other stages ("second," "third," etc.) can be more tricky among which to establish an order (e.g., in such cases, ordinal order can be determined by concentration levels of one or more components in the composite input feed composition, such as $CO_2$ for instance, from highest concentration "first" to lowest concentration "last" with approximately similar compositional distinctions representing the same ordinal level.)

Yet another additional or alternate option can be to specify the anode fuel utilization corresponding to a particular cathode stage (again, where fuel cells/stacks can be arranged at least partially in one or more series arrangements). As noted above, based on the direction of the flows within the anodes and cathodes, the first cathode stage may not correspond to (be across the same fuel cell membrane from) the first anode stage. Thus, in some aspects of the invention, the anode fuel utilization can be specified for the first cathode stage in a series, the second cathode stage in a series, the final cathode stage in a series, or any other convenient cathode stage in a series.

Yet still another additional or alternate option can be to specify an overall average of fuel utilization over all fuel cells in a fuel cell array. In various aspects, the overall average of fuel utilization for a fuel cell array can be about 65% or less, for example, about 60% or less, about 55% or less, about 50% or less, or about 45% or less (additionally or alternately, the overall average fuel utilization for a fuel cell array can be at least about 25%, for example at least about 30%, at least about 35%, or at least about 40%). Such an average fuel utilization need not necessarily constrain the fuel utilization in any single stage, so long as the array of fuel cells meets the desired fuel utilization.

Integration Example: Applications for Integration with Combustion Turbines

In various aspects, the exhaust from a combustion source, such as a gas turbine, can be passed into an MCFC that is incorporated as part of the structure of a HRSG system, as described above. Preferably, the gas turbine can combust natural gas, methane gas, or another hydrocarbon gas in a combined cycle mode integrated with steam generation and heat recovery for additional efficiency. Modern natural gas combined cycle efficiencies are about 60% for the largest and newest designs. The resulting $CO_2$-containing exhaust gas stream can be produced at an elevated temperature compatible with the MCFC operation, such as 300° C.-700° C. and preferably 500° C.-650° C. The fuel gas source can optionally but preferably be cleaned of contaminants such as sulfur that can poison the MCFC before entering the turbine. Alternatively, the gas source can be a coal-fired generator, wherein the exhaust gas would typically be cleaned post-combustion due to the greater level of contaminants in the exhaust gas. In such an alternative, some heat exchange to/from the gas may be necessary to enable clean-up at lower temperatures. In additional or alternate embodiments, the source of the $CO_2$-containing exhaust gas can be the output from a boiler, combustor, or other heat source that burns carbon-rich fuels. In other additional or alternate embodiments, the source of the $CO_2$-containing exhaust gas can be bio-produced $CO_2$ in combination with other sources.

For integration with a combustion source, some alternative configurations for processing of a fuel cell anode can be desirable. For example, an alternative configuration can be to recycle at least a portion of the exhaust from a fuel cell anode to the input of a fuel cell anode. The anode output stream from an MCFC anode can include $H_2O$, $CO_2$, optionally CO, and optionally but typically unreacted fuel (such as $H_2$ or $CH_4$) as the primary output components. Instead of using this output stream as an external fuel stream and/or an input stream for integration with another process, one or more separations can be performed on the anode output stream in order to separate the $CO_2$ from the components with potential fuel value, such as $H_2$ or CO. The components with fuel value can then be recycled to the input of an anode.

This type of configuration can provide one or more benefits. First, $CO_2$ can be separated from the anode output, such as by using a cryogenic $CO_2$ separator. Several of the components of the anode output ($H_2$, CO, $CH_4$) are not easily condensable components, while $CO_2$ and $H_2O$ can be separated individually as condensed phases. Depending on the embodiment, at least about 90 vol % of the $CO_2$ in the anode output can be separated to form a relatively high purity $CO_2$ output stream. Alternatively, in some aspects less $CO_2$ can be removed from the anode output, so that about 50 vol % to about 90 vol % of the $CO_2$ in the anode output can be separated out, such as about 80 vol % or less or about 70 vol % or less. After separation, the remaining portion of the anode output can correspond primarily to components with fuel value, as well as reduced amounts of $CO_2$ and/or $H_2O$. This portion of the anode output after separation can be recycled for use as part of the anode input, along with additional fuel. In this type of configuration, even though the fuel utilization in a single pass through the MCFC(s) may be low, the unused fuel can be advantageously recycled for another pass through the anode. As a result, the single-pass fuel utilization can be at a reduced level, while avoiding loss (exhaust) of unburned fuel to the environment.

Additionally or alternatively to recycling a portion of the anode exhaust to the anode input, another configuration option can be to use a portion of the anode exhaust as an input for a combustion reaction for a turbine or other combustion device, such as a boiler, furnace, and/or fired heater. The relative amounts of anode exhaust recycled to the anode input and/or as an input to the combustion device can be any convenient or desirable amount. If the anode exhaust is recycled to only one of the anode input and the combustion device, the amount of recycle can be any convenient amount, such as up to 100% of the portion of the anode exhaust remaining after any separation to remove $CO_2$ and/or $H_2O$. When a portion of the anode exhaust is recycled to both the anode input and the combustion device, the total recycled amount by definition can be 100% or less of the remaining portion of anode exhaust. Otherwise, any convenient split of the anode exhaust can be used. In various embodiments of the invention, the amount of recycle to the anode input can be at least about 10% of the anode exhaust remaining after separations, for example at least about 25%, at least about 40%, at least about 50%, at least about 60%, at least about 75%, or at least about 90%. Additionally or alternately in those embodiments, the amount of recycle to the anode input can be about 90% or less of the anode exhaust remaining after separations, for example about 75% or less, about 60% or less, about 50% or less, about 40% or less, about 25% or less, or about 10% or less. Further additionally or alternatively, in various embodiments of the invention, the amount of recycle to the combustion device can be at least about 10% of the anode exhaust remaining after separations, for example at least about 25%, at least about 40%, at least about 50%, at least about 60%, at least about 75%, or at least about 90%. Additionally or alternately in those embodiments, the amount of recycle to the combustion device can be about 90% or less of the anode exhaust remaining after separations, for example about 75% or less, about 60% or less, about 50% or less, about 40% or less, about 25% or less, or about 10% or less. Additional details related to operation of molten carbonate fuel cells with exhaust gas recycle can be found, for example, in U.S. application Ser. No. 14/207,688, the relevant contents of which are incorporated herein by reference.

In still other alternative aspects of the invention, the fuel for a combustion device can additionally or alternately be a fuel with an elevated quantity of components that are inert and/or otherwise act as a diluent in the fuel. $CO_2$ and $N_2$ are examples of components in a natural gas feed that can be relatively inert during a combustion reaction. When the amount of inert components in a fuel feed reaches a sufficient level, the performance of a turbine or other combustion source can be impacted. The impact can be due in part to the ability of the inert components to absorb heat, which can tend to quench the combustion reaction. Examples of fuel feeds with a sufficient level of inert components can include fuel feeds containing at least about 20 vol % $CO_2$, or fuel feeds containing at least about 40 vol % $N_2$, or fuel feeds containing combinations of $CO_2$ and $N_2$ that have sufficient inert heat capacity to provide similar quenching ability. (It is noted that $CO_2$ has a greater heat capacity than $N_2$, and therefore lower concentrations of $CO_2$ can have a similar impact as higher concentrations of $N_2$. $CO_2$ can also participate in the combustion reactions more readily than $N_2$, and in doing so remove $H_2$ from the combustion. This consumption of $H_2$ can have a large impact on the combustion of the fuel, by reducing the flame speed and narrowing the flammability range of the air and fuel mixture.) More generally, for a fuel feed containing inert components that impact the flammability of the fuel feed, the inert components in the fuel feed can be at least about 20 vol %, such as at least about 40 vol %, or at least about 50 vol %, or at least about 60 vol %. Preferably, the amount of inert components in the fuel feed can be about 80 vol % or less.

When a sufficient amount of inert components are present in a fuel feed, the resulting fuel feed can be outside of the flammability window for the fuel components of the feed. In this type of situation, addition of $H_2$ from a recycled portion of the anode exhaust to the combustion zone for the generator can expand the flammability window for the combination of fuel feed and $H_2$, which can allow, for example, a fuel feed containing at least about 20 vol % $CO_2$ or at least about 40% $N_2$ (or other combinations of $CO_2$ and $N_2$) to be successfully combusted.

Relative to a total volume of fuel feed and $H_2$ delivered to a combustion zone, the amount of $H_2$ for expanding the flammability window can be at least about 5 vol % of the total volume of fuel feed plus $H_2$, such as at least about 10 vol %, and/or about 25 vol % or less. Another option for characterizing the amount of $H_2$ to add to expand the flammability window can be based on the amount of fuel components present in the fuel feed before $H_2$ addition. Fuel components can correspond to methane, natural gas, other hydrocarbons, and/or other components conventionally viewed as fuel for a combustion-powered turbine or other generator. The amount of $H_2$ added to the fuel feed can correspond to at least about one third of the volume of fuel components (1:3 ratio of $H_2$:fuel component) in the fuel feed, such as at least about half of the volume of the fuel components (1:2 ratio). Additionally or alternately, the amount of $H_2$ added to the fuel feed can be roughly equal to the volume of fuel components in the fuel feed (1:1 ratio) or less. For example, for a feed containing about 30 vol % $CH_4$, about 10% $N_2$, and about 60% $CO_2$, a sufficient amount of anode exhaust can be added to the fuel feed to achieve about a 1:2 ratio of $H_2$ to $CH_4$. For an idealized anode exhaust that contained only $H_2$, addition of $H_2$ to achieve a 1:2 ratio would result in a feed containing about 26 vol % $CH_4$, 13 vol % $H_2$, 9 vol % $N_2$, and 52 vol % $CO_2$.

Additional Embodiments

Embodiment 1. A method of treating exhaust gas to reduce $CO_2$ using molten carbonate fuel cells located inside a heat recovery steam generator ("HRSG"), the method comprising: receiving $CO_2$-containing exhaust gas through an inlet of the HRSG to form a received gas flow; passing the received gas flow through a fuel cell screen comprising a plurality of molten carbonate fuel cells to generate a cathode exhaust gas comprising at least about 50 vol % less $CO_2$ than the received gas flow, the fuel cell screen being located within the HRSG, wherein substantially all of the received gas flow is passed into a cathode section of the molten carbonate fuel cells; passing the cathode exhaust gas into a first heat exchanger; and passing the cathode exhaust gas into an exhaust stack.

Embodiment 2. The method of Embodiment 1, wherein the method further comprises passing the received gas flow into a duct burner prior to passing the received gas flow into the fuel cell screen, the received gas flow optionally being passed into the duct burner with a superficial velocity of at least about 4 m/s (e.g., at least about 5 m/s or at least about 6 m/s).

Embodiment 3. The method of any one of the previous embodiments, wherein: the method further comprises passing the received gas flow into the fuel cell screen with a superficial of about 4 m/s or less (e.g., about 3 m/s or less, about 2 m/s or less, or about 1 m/s or less); the method further comprises passing the cathode exhaust gas into the first heat exchanger with a superficial velocity of at least about 4 m/s (e.g., at least about 5 m/s or at least about 6 m/s); wherein the $CO_2$-containing exhaust gas received through the inlet of the HRSG has a superficial velocity of at least about 4 m/s (e.g., at least about 5 m/s or at least about 6 m/s); or a combination thereof.

Embodiment 4. The method of any one of the previous embodiments, wherein the fuel cell screen comprises a first layer and a second layer, and the method further comprises dividing the received gas flow into at least a first gas flow portion that is passed to the first layer and a second gas flow portion that is passed to the second layer.

Embodiment 5. The method of any one of the previous embodiments, further comprising passing the received gas flow into a second heat exchanger prior to passing the received gas flow into the fuel cell screen.

Embodiment 6. The method of any one of the previous embodiments, wherein the plurality of molten carbonate fuel cells are operated with a current density of greater than about 1500 $mA/m^2$.

Embodiment 7. The method of any one of the previous embodiments, wherein passing the received gas flow through the fuel cell screen comprising the plurality of molten carbonate fuel cells generates a cathode exhaust gas comprising at least about 60 vol % less (e.g., at least about 65 vol % less, at least about 70 vol % less, at least about 75 vol % less, or at least about 80 vol % less) $CO_2$ than the received gas flow.

Embodiment 8. The method of any one of the previous embodiments, wherein the $CO_2$-containing exhaust gas comprises an exhaust gas from a gas turbine.

Embodiment 9. The method of any one of the previous embodiments, wherein the cathode exhaust comprises substantially all of the gas in the flow path providing heat to the first heat exchanger.

Embodiment 10. A heat recovery steam generator ("HRSG") for producing electricity using an integrated molten carbonate fuel cell comprising an anode and cathode, the HRSG comprising: an enclosure that forms a flow path that extends between an inlet that receives a gas flow and an outlet that exhausts at least a portion of the received gas flow; one or more heat exchangers extending into the flow path; and a fuel cell screen located within the enclosure and comprising a plurality of molten carbonate fuel cells having cathode inlets, the fuel cell screen being oriented in the flow path so that the cathode inlets of the molten carbonate fuel cells receive substantially all of the received gas flow, the plurality of molten carbonate fuel cells also having a plurality of cathode outlets fluidly exposed to the flow path to discharge cathode exhaust to the flow path.

Embodiment 11. The HRSG of Embodiment 10, wherein the fuel cell screen is located in the flow path downstream from a duct burner located within the HRSG and upstream from the one or more heat exchangers.

Embodiment 12. The HRSG of Embodiment 10 or Embodiment 11, wherein the fuel cell screen is located in the flow path upstream from the one or more heat exchangers.

Embodiment 13. The HRSG of Embodiment 12, wherein the cathode exhaust comprises substantially all of the gas in the flow path providing heat to the one or more heat exchangers downstream of the fuel cell screen.

Embodiment 14. The HRSG of Embodiment 12 or Embodiment 13, wherein a first cross sectional area of the enclosure at the fuel cell screen is at least double a second cross-sectional area downstream of the first cross sectional area where the one or more heat exchangers are located.

Embodiment 15. The HRSG of Embodiment 10 or Embodiment 11, wherein the fuel cell screen is located in the flow path downstream from a first heat exchanger of the one or more heat exchangers and upstream from a second heat exchanger of the one or more heat exchangers.

Embodiment 16. The HRSG of Embodiment 14, wherein the cathode exhaust comprises substantially all of the gas in the flow path providing heat to the second heat exchanger.

Embodiment 17. The HRSG of Embodiment 15 or Embodiment 16, wherein a first cross sectional area of the enclosure at the fuel cell screen is at least double a second cross-sectional area downstream of the first cross sectional area where the second heat exchanger is located.

Embodiment 18. The HRSG of any one of embodiments 10-17, wherein the fuel cell screen is sized to reduce a $CO_2$ concentration in the cathode exhaust by at least about 65% (e.g., by at least about 70%, by at least about 75%, or by at least about 80%) relative to the received gas flow.

Embodiment 19. The HRSG of any one of embodiments 10-18, wherein the plurality of molten carbonate fuel cells are operated with a current density of greater than about 1500 $mA/m^2$.

Embodiment 20. The HRSG of any one of embodiments 10-19, wherein a layer of the fuel screen comprises at least about 5 fuel cell stacks(e.g., at least about 10 fuel cell stacks or at least about 20 fuel cell stacks).

Embodiment 21. The HRSG of any one of embodiments 10-20, wherein the plurality of molten carbonate fuel cells in the fuel cell screen comprise multiple layers of molten carbonate fuel cells.

Embodiment 22. The HRSG of Embodiment 21, wherein the multiple layers of molten carbonate fuel cells in the fuel cell screen are fluidly arranged to provide parallel processing of the received gas flow.

Embodiment 23. The HRSG of any one of embodiments 10-22, wherein a cross sectional area of the enclosure is provided to generate a superficial velocity of at least about 4 m/s (e.g., at least about 5 m/s or at least about 6 m/s) for the received gas flow; wherein a cross sectional area of the enclosure at the fuel cell screen is provided to generate a superficial velocity of about 4 m/s or less (e.g., about 3 m/s or less, about 2 m/s or less, or about 1 m/s or less) for the received gas flow; or a combination thereof.

Embodiment 24. The HRSG of any one of embodiments 10-23, wherein the HRSG further comprises a second fuel cell screen comprising a second plurality of molten carbonate fuel cells.

Embodiment 25. A method of treating exhaust gas to reduce $CO_2$ using molten carbonate fuel cells located inside a heat recovery steam generator comprising treating an exhaust gas using an HRSG according to any one of embodiments 10-24.

While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining the true scope of the present invention.

What is claimed is:

1. A method of treating exhaust gas to reduce $CO_2$ using a molten carbonate fuel cell located inside a heat recovery steam generator ("HRSG"), the method comprising:
    receiving $CO_2$-containing exhaust gas through an inlet of the HRSG to form a received gas flow;
    passing the received gas flow through a fuel cell screen comprising a plurality of molten carbonate fuel cells to generate a cathode exhaust gas comprising at least about 50 vol % less $CO_2$ than the received gas flow, the fuel cell screen being located within the HRSG, wherein substantially all of the received gas flow is passed into a cathode section of the molten carbonate fuel cells;
    passing the cathode exhaust gas into a first heat exchanger; and
    passing the cathode exhaust gas into an exhaust stack.

2. The method of claim 1, wherein the method further comprises passing the received gas flow into a duct burner prior to passing the received gas flow into the fuel cell screen.

3. The method of claim 2, wherein passing the received gas flow into the duct burner comprises passing the received gas flow into the duct burner with a superficial velocity of at least about 4 m/s.

4. The method of claim 1, wherein the method further comprises passing the received gas flow into the fuel cell screen with a superficial velocity of about 1 m/s or less.

5. The method of claim 1, wherein the method further comprises passing the cathode exhaust gas into the first heat exchanger with a superficial velocity of at least about 4 m/s.

6. The method of claim 1, wherein the $CO_2$-containing exhaust gas received through the inlet of the HRSG has a superficial velocity at the inlet of at least about 4 m/s.

7. The method of claim 1, wherein the fuel cell screen comprises a first layer and a second layer, and the method further comprises dividing the received gas flow into at least a first gas flow portion that is passed to the first layer and a second gas flow portion that is passed to the second layer.

8. The method of claim 1, further comprising passing the received gas flow into a second heat exchanger prior to passing the received gas flow into the fuel cell screen.

9. The method of claim 1, wherein the plurality of molten carbonate fuel cells are operated with a current density of greater than about 1500 $mA/m^2$.

10. The method of claim 1, wherein the $CO_2$-containing exhaust gas comprises an exhaust gas from a gas turbine.

11. The method of claim 1, wherein the cathode exhaust comprises substantially all of the gas in the flow path providing heat to the first heat exchanger.

12. The method of claim 1, wherein the fuel cell screen is sized to reduce a $CO_2$ concentration in the cathode exhaust by at least about 65% relative to the received gas flow.

* * * * *